(12) United States Patent
Donovan et al.

(10) Patent No.: US 8,769,836 B2
(45) Date of Patent: *Jul. 8, 2014

(54) ARTICLE OF FOOTWEAR WITH COLOR CHANGE PORTION AND METHOD OF CHANGING COLOR

(75) Inventors: Sharna M. Donovan, Hillsboro, OR (US); Sean D. Hartford, Portland, OR (US); Michelle L. Kvernmo, Tigard, OR (US); Andrew A. Owings, Portland, OR (US); Bradley W. Wilkins, Aloha, OR (US)

(73) Assignee: NIKE, Inc., Beaverton, OR (US)

( * ) Notice: Subject to any disclaimer, the term of this patent is extended or adjusted under 35 U.S.C. 154(b) by 168 days.

This patent is subject to a terminal disclaimer.

(21) Appl. No.: 13/528,240

(22) Filed: Jun. 20, 2012

(65) Prior Publication Data

US 2013/0033378 A1    Feb. 7, 2013

Related U.S. Application Data

(63) Continuation-in-part of application No. 12/820,625, filed on Jun. 22, 2010, now Pat. No. 8,474,146.

(51) Int. Cl.
A43D 1/00 (2006.01)

(52) U.S. Cl.
USPC .......................................................... 33/3 A

(58) Field of Classification Search
CPC ................................ A43D 1/02; A61B 5/1074
USPC ...................................... 33/3 A, 3 B, 3 C, 3 R
See application file for complete search history.

(56) References Cited

U.S. PATENT DOCUMENTS

| | | | |
|---|---|---|---|
| 3,549,878 A | 12/1970 | Bailey | |
| 4,748,366 A | 5/1988 | Taylor | |
| 4,771,394 A | 9/1988 | Cavanagh | |
| 5,289,301 A | 2/1994 | Brewer | |
| 5,495,682 A | 3/1996 | Chen | |
| 5,500,635 A * | 3/1996 | Mott | ............................... 33/3 R |
| 5,813,148 A | 9/1998 | Guerra | |
| 5,906,004 A | 5/1999 | Lebby et al. | |
| 6,080,690 A | 6/2000 | Lebby et al. | |

(Continued)

FOREIGN PATENT DOCUMENTS

| | | |
|---|---|---|
| JP | 2001204507 | 7/2001 |
| WO | 2007072352 | 6/2007 |

(Continued)

OTHER PUBLICATIONS

Rodrigo Martins et al. Selective Floating Gate Non-Volatile Paper Memory Transistor, Rapid Research Letters, Published on Oct. 9, 2009, Caparica, Portugal.

(Continued)

*Primary Examiner* — G. Bradley Bennett
(74) *Attorney, Agent, or Firm* — Plumsea Law Group, LLC

(57) ABSTRACT

An article with a color change portion and a method of changing color is disclosed. The article includes at least one color change portion capable of changing colors. The color change portion comprised electrochromic fiber or fabric. The color change portion can change colors according to one or more performance parameters. The article can be connected to a computer and the color change portion can be controlled using the computer.

24 Claims, 16 Drawing Sheets

(56) References Cited

U.S. PATENT DOCUMENTS

| | | |
|---|---|---|
| 6,182,378 B1 | 2/2001 | Sendaula |
| 6,744,145 B2 | 6/2004 | Chang |
| 6,864,875 B2 | 3/2005 | Drzaic et al. |
| 6,890,715 B1 | 5/2005 | Lewis et al. |
| 6,922,276 B2 | 7/2005 | Zhang et al. |
| 6,936,190 B2 | 8/2005 | Yoshida |
| 6,969,291 B2 | 11/2005 | Urabe et al. |
| 6,987,603 B2 | 1/2006 | Paolini, Jr. et al. |
| 7,020,508 B2 | 3/2006 | Stivoric et al. |
| 7,071,289 B2 | 7/2006 | Sotzing |
| 7,075,226 B2 | 7/2006 | Cok |
| 7,078,850 B2 | 7/2006 | Sakai |
| 7,105,237 B2 | 9/2006 | Sotzing |
| 7,118,692 B2 | 10/2006 | Nordquist et al. |
| 7,125,479 B2 | 10/2006 | Sotzing |
| 7,167,155 B1 | 1/2007 | Albert et al. |
| 7,195,170 B2 | 3/2007 | Matsumoto et al. |
| 7,201,952 B2 | 4/2007 | Iftime et al. |
| 7,321,012 B2 | 1/2008 | Sotzing |
| 7,332,223 B2 | 2/2008 | Sotzing et al. |
| 7,409,784 B2 | 8/2008 | Yeh |
| 7,420,549 B2 | 9/2008 | Jacobson et al. |
| 7,421,806 B2 | 9/2008 | Braynock et al. |
| 7,432,340 B2 | 10/2008 | Zahn et al. |
| 7,468,842 B2 | 12/2008 | Steenblik et al. |
| 7,494,237 B1 | 2/2009 | Cheung |
| 7,528,822 B2 | 5/2009 | Amundson et al. |
| 7,535,624 B2 | 5/2009 | Amundson et al. |
| 7,572,879 B2 | 8/2009 | Zahn et al. |
| 7,586,663 B1 | 9/2009 | Radmard et al. |
| 7,626,748 B2 | 12/2009 | Radmard et al. |
| 7,675,672 B2 | 3/2010 | Cernasov |
| 7,737,247 B2 | 6/2010 | Sotzing |
| 7,746,533 B2 | 6/2010 | Sotzing et al. |
| 7,951,902 B2 | 5/2011 | Sotzing |
| 8,107,153 B2 | 1/2012 | Sotzing et al. |
| 8,168,671 B2 | 5/2012 | Sotzing |
| 8,178,629 B2 | 5/2012 | Sotzing et al. |
| 8,227,567 B2 | 7/2012 | Sotzing |
| 8,474,146 B2 * | 7/2013 | Hartford et al. ................ 33/3 A |
| 2003/0207638 A1 | 11/2003 | Bowlin et al. |
| 2003/0224155 A1 | 12/2003 | Orth et al. |
| 2004/0010115 A1 | 1/2004 | Sotzing |
| 2004/0074779 A1 | 4/2004 | Sotzing |
| 2004/0093746 A1 * | 5/2004 | Varsallona ...................... 33/3 A |
| 2004/0100792 A1 | 5/2004 | Trzecieski |
| 2004/0242792 A1 | 12/2004 | Sotzing |
| 2005/0124784 A1 | 6/2005 | Sotzing |
| 2005/0263394 A1 | 12/2005 | Lewis et al. |
| 2006/0159907 A1 | 7/2006 | Percec et al. |
| 2006/0203322 A1 | 9/2006 | Radmard et al. |
| 2006/0221596 A1 | 10/2006 | Chang |
| 2006/0241279 A1 | 10/2006 | Sotzing et al. |
| 2006/0275660 A1 | 12/2006 | Zama et al. |
| 2007/0000154 A1 | 1/2007 | DiBenedetto et al. |
| 2007/0008603 A1 | 1/2007 | Sotzing et al. |
| 2007/0089845 A1 | 4/2007 | Sotzing et al. |
| 2007/0191576 A1 | 8/2007 | Sotzing et al. |
| 2007/0201221 A1 | 8/2007 | Cherdak et al. |
| 2007/0222370 A1 | 9/2007 | Zhu et al. |
| 2007/0273951 A1 | 11/2007 | Ribi |
| 2008/0037131 A1 | 2/2008 | Steenblik et al. |
| 2008/0062677 A1 | 3/2008 | Konig et al. |
| 2008/0141433 A1 | 6/2008 | Rhodes-Vivour |
| 2008/0167535 A1 | 7/2008 | Stivoric et al. |
| 2008/0258999 A1 | 10/2008 | Van Doorn |
| 2009/0007458 A1 | 1/2009 | Seiler |
| 2009/0019731 A1 | 1/2009 | Braynock et al. |
| 2009/0193689 A1 | 8/2009 | Galica et al. |
| 2009/0203873 A1 | 8/2009 | Sotzing |
| 2009/0242113 A1 | 10/2009 | Radmard et al. |
| 2009/0278449 A1 | 11/2009 | Choi et al. |
| 2009/0278707 A1 * | 11/2009 | Biggins et al. ..................... 36/54 |
| 2009/0311799 A1 | 12/2009 | Sotzing et al. |
| 2009/0326187 A1 | 12/2009 | Sotzing |
| 2010/0032660 A1 | 2/2010 | Nomoto et al. |
| 2010/0053724 A1 | 3/2010 | Raginidas et al. |
| 2010/0113727 A1 | 5/2010 | Sotzing |
| 2010/0117975 A1 | 5/2010 | Cho |
| 2010/0238534 A1 | 9/2010 | Radmard et al. |
| 2010/0245971 A1 | 9/2010 | Sotzing et al. |
| 2010/0288343 A1 | 11/2010 | Sotzing et al. |
| 2010/0289971 A1 | 11/2010 | Odland et al. |
| 2011/0168951 A1 | 7/2011 | Sotzing |
| 2011/0192053 A1 * | 8/2011 | Beers ............................. 36/103 |
| 2011/0201826 A1 | 8/2011 | Sotzing |
| 2011/0233532 A1 | 9/2011 | Sotzing et al. |
| 2011/0265347 A1 * | 11/2011 | Leary et al. ..................... 36/93 |
| 2011/0308113 A1 | 12/2011 | Hartford et al. |
| 2011/0314698 A1 * | 12/2011 | Cox et al. ........................ 36/100 |
| 2013/0332107 A1 * | 12/2013 | Hlavacek et al. ............. 702/158 |

FOREIGN PATENT DOCUMENTS

| | | |
|---|---|---|
| WO | 2007121355 | 10/2007 |
| WO | 2007001809 | 11/2007 |
| WO | 2007123970 | 11/2007 |
| WO | 2007128049 | 11/2007 |
| WO | 2009096802 | 8/2009 |
| WO | 2009115913 | 9/2009 |
| WO | 2009130551 | 10/2009 |
| WO | 2009134860 | 11/2009 |

OTHER PUBLICATIONS

International Search Report and Written Opinion mailed Dec. 5, 2011 in International Application No. PCT/US2011/041068.
International Preliminary Report on Patentability (including Written Opinion of the ISA) mailed Jan. 10, 2013 in International Application No. PCT/US2011/041068.

* cited by examiner

ARTICLE OF FOOTWEAR WITH COLOR CHANGE PORTION AND METHOD OF CHANGING COLOR

CROSS-REFERENCE TO RELATED APPLICATION(S)

This application is a continuation-in-part application of co-pending application Ser. No. 12/820,625 filed Jun. 22, 2010, the disclosure of which is hereby incorporated by reference.

BACKGROUND

The present invention relates generally to an article of footwear, and in particular to an article of footwear with a color changing portion.

Articles associated with regions that change color have been previously proposed. Braynock et al. (U.S. Pat. No. 7,421,806) teaches an article of footwear that is designed to allow a user to change its color. The article of footwear has a transparent panel. The user uses a sock or inner liner between his or her foot and the upper to display whatever color is desirable through the transparent panel.

Brewer (U.S. Pat. No. 5,289,301) teaches a color change article using LCD technology. An LCD panel is incorporated into the upper of an article of footwear. The color of the panel varies depending on the voltage that is transmitted to the LCD panel from a potentiometer. Taylor (U.S. Pat. No. 4,748,366) teaches that electrochromographic materials can be incorporated into footwear along with a piezoelectric power source.

Van Doom (U.S. patent application publication number 2008/0258999) teaches a pair of sunglasses that changes color. A sensor is included on the glasses that can detect the color of a user's clothing and changes the color of an LED embedded in the frame to match. The user can alternatively select a coordinating color manually.

DiBenedetto et al. (U.S. patent application publication number 2007/0000154) teaches an adaptive article of footwear. The footwear incorporates a variety of electrical features, including a sensor. The sensor can measure the degree to which the midsole compresses during a user's use of the article of footwear. The data is stored in a memory system in the article of footwear. The system is designed to function in a self-contained manner or to synchronize to a computer for instructions on how to modify the article of footwear.

There is a need for articles that address the limitations of the related art.

SUMMARY

In one aspect, the invention provides a method of operating an article of footwear with a color change portion, comprising: measuring a performance parameter; coloring the color change portion with a first color when the performance parameter is in a first range of values; coloring the color change portion with a second color when the performance parameter is in a second range of values, the second range of values being substantially different from the first range of values and the second color being substantially different from the first color; and wherein the color change portion comprises an electrochromographic material.

In another aspect, the invention provides a method of operating an article of footwear with a color change portion, comprising: receiving a user selected color; applying an electrical signal to an electrochromographic material associated with the color change portion; and thereby changing the color change portion from an initial color to the user selected color, the initial color being different from the user selected color.

In another aspect, the invention provides a method of operating an article of footwear with a color change portion, comprising: receiving information related to a first color of an object, the object being associated with a user of the article of footwear; determining a second color for the color change portion according to the first color; applying an electrical signal to an electrochromographic material associated with the color change portion; and thereby changing the color change portion to the second color.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
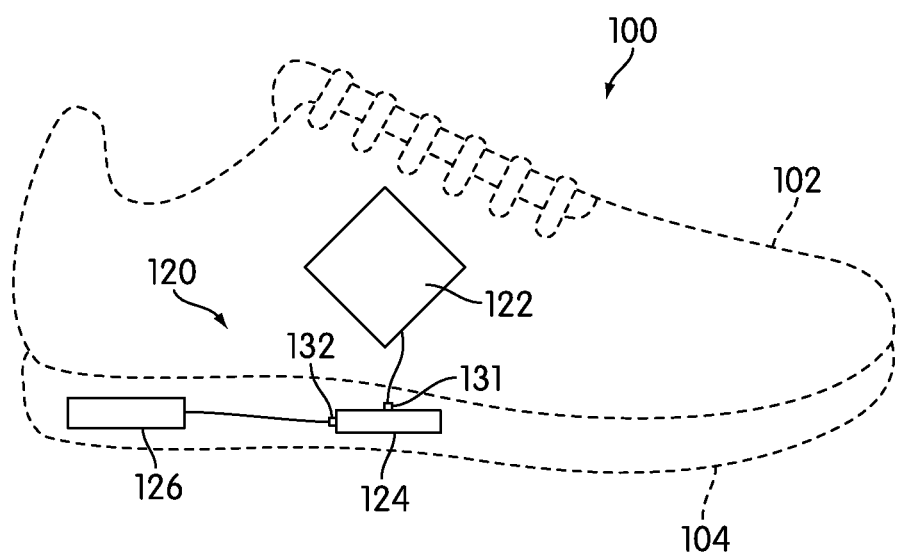
FIG. 1 is schematic view of an embodiment of an article of footwear with a color change portion.

FIG. 1 illustrates a schematic view of an exemplary embodiment of article of footwear 100. For clarity, the following detailed description discusses an exemplary embodiment, in the form of a running shoe, but it should be noted that the present invention could take the form of any article of footwear including, but not limited to: hiking boots, soccer shoes, football shoes, sneakers, rugby shoes, basketball shoes, baseball shoes as well as other kinds of shoes. As shown in FIG. 1, article of footwear 100, also referred to simply as article 100, is intended to be used with a right foot; however, it should be understood that the following discussion may equally apply to a mirror image of article of footwear 100 that is intended for use with a left foot.

Article of footwear 100 may be configured with upper 102 and sole 104. For purposes of clarity, some portions of article 100 are shown in solid lines and others are shown in phantom lines. In addition, the current embodiment illustrates some components of article 100 but may not illustrate all components of article 100.

Article 100 can include color change system 120. The term "color change system" as used throughout this detailed description and in the claims refers to any system capable of providing different colors for one or more portions of article 100. Color change system 120 can comprise color change portion 122. The term "color change portion" as used throughout this detailed description and in the claims refers to any portion of an article that is configured to undergo some type of color change. The term "color change portion" is not limited to any particular location. A color changing portion can be located on any portion of an article including any portion of an upper, any portion of a sole, as well as other components associated with an article of footwear such as shoe laces, straps, liners, or any other component of an article. A color change portion is also not limited to any size and/or shape. In the exemplary embodiment, color change portion 122 is associated with a diamond shaped logo for article 100. However, in other embodiments, a color change portion could be configured with any shape including, but not limited to: stripes, panels, polygons, regular shapes, irregular shapes as well as any other type of shape. In addition, while a single color changing portion is illustrated in the current embodiment, other embodiments can include two or more color changing portions.

One or more color changing portions can comprise any regions of an article. For example, one embodiment may include an article with trim comprising a color change portion. In another embodiment, a substantial majority of an upper may comprise a color change portion. In a further embodiment, the entire upper of an article of footwear may be formed of a color changing material. In still another embodiment, an upper may comprise distinct panels comprising color change portions. In still another embodiment, a midsole may comprise a color change portion. In further embodiments, the midsole may comprise electrochromic fiber or fabric. In still another embodiment, an outsole may comprise a color change portion. In some embodiments, the outsole may comprise electrochromic fiber or fabric.

In some embodiments, the article of footwear comprises an upper having one or more distinct color change portions attached to or separate from the upper of the article of footwear. In further embodiments, at least one color change portion may be the upper itself, or a substantial majority of the upper. In other embodiments, the color change portion may be a discrete component or layer attached to the upper. The color change portions of the upper may comprise electrochromic fiber or fabric.

It will be understood that a color change portion can be configured to display more than a single color simultaneously. For example, in some embodiments color change portions may be configured to display patterns and/or graphics. In some embodiments, color change portions may be configured to display numbers. In other embodiments, color change portions may be configured to display words. In other embodiments, color change portions could be configured to display colored stripes and a background color that is different from the stripe color. In still other embodiments, an upper may comprise a single color change portion that is configured to display a first color over the majority of the upper and a second color for a logo on the side of the upper.

In different embodiments, color change portions can be associated with different color change technologies. In particular, the color change portions discussed throughout this detailed description are not limited to use with any specific type of color change technology. Examples of color change technologies are known in the art and include, but are not limited to: electrochemical transistor based color change technologies, LCD panel technologies, LED screen technologies, fiber optic technologies, electrochromographic materials, electrochromic fibers or fabrics, electronic paper technologies (including electrophoretic technologies, electrowetting technologies and electrofluidic technologies), electroluminescent strips, as well as other color change technologies. In another embodiment, color change portions can be associated with electronic paper technologies. Examples are disclosed in U.S. Pat. Nos. 7,535,624; 7,528,822; 7,420,549; 7,167,155; 7,201,952; 6,987,603; 6,922,276; 6,864,875, each of which is hereby incorporated by reference.

In one embodiment, color change portions can be associated with flexible electronic paper technologies that retain color change after removal of applied power. Examples are disclosed in any of the following: U.S. Patent Application Publication Number 2010/0117975, U.S. Patent Application Publication Number 2010/0053724, U.S. Pat. Nos. 7,675,672, 7,195,170, and 6,936,190, the entirety of each being hereby incorporated by reference.

In another embodiment, color change portions can be associated with one or more of organic thin film transistor technologies, organic light emitting diode (OLED) technologies, flexible OLED technologies, as well as other electroluminescent elements. Examples are disclosed in any of the following: U.S. Patent Application Publication Number 2010/0032660, U.S. Patent Application Publication Number 2009/0278449, U.S. Patent Application Publication Number 2007/0222370, U.S. Pat. Nos. 7,075,226, and 6,969,291, the entirety of each being hereby incorporated by reference.

In another embodiment, color change portions can be associated with electronically controllable visually dynamic textiles or flexible substrates as are disclosed in U.S. Patent Application Publication Number 2003/0224155, the entirety of which is hereby incorporated by reference. In another embodiment, color change portions can comprise electroluminescent strips. An example is disclosed in U.S. Patent Application Publication Number 2008/0062677, the entirety of which is hereby incorporated by reference. In still another embodiment, color change portions can comprise electrochromic materials. An example is disclosed in U.S. Patent Application Publication Number 2006/0275660, the entirety of which is hereby incorporated by reference. In addition, any other type of color change technologies can be used including any technologies disclosed in any of the following: U.S. Pat. No. 5,289,301; U.S. Patent Application Publication Number 2006/0221596; U.S. Patent Application Publication Number 2004/0100792; U.S. Patent Application Publication Number 2009/0007458; U.S. Pat. No. 4,4748,366; U.S. Patent Application Publication Number 2008/0258999; and U.S. Pat. No. 6,080,690, the entirety of each being hereby incorporated by reference.

In another embodiment, color change portions can be associated with one or more of electrochromic compounds and polymers, including but not limited to polymers containing thieno[3,4-b]thiophenes and/or thieno[3,4-b]furan monomeric units, polymer sulfonated poly(imides), polymer sulfonated poly(amic acids) and luminescent nucleic acid materials, as well as fibers, fabrics, materials and devices incorporating such compounds and polymers. Examples are disclosed in any of the following: U.S. Patent Application Publication Number 2011/0233532, U.S. Patent Application Publication Number 2011/0201826, U.S. Patent Application Publication Number 2011/0168951, U.S. Patent Application Publication Number 2010/0288343, U.S. Patent Application Publication Number 2010/0245971, U.S. Patent Application Publication Number 2009/0326187, U.S. Patent Application Publication Number 2009/0311799, U.S. Patent Application Publication Number 2007/0191576, U.S. Patent Application Publication Number 2007/0089845, U.S. Pat. Nos. 7,951,902, 7,746,533, 7,737,247, 7,626,748, 7,586,663, 7,572,879, 7,432,340, 7,332,223, 7,321,012, 7,125,479, 7,118,692, 7,105,237, 7,071,289, and 6,890,715, the entirety of each being hereby incorporated by reference.

In some embodiments, the color change system comprises electrochromic fiber or fabric, as described in U.S. Patent Application Publication Number 2010/0245971, as incorporated by reference in its entirety above. The fiber or fabric may comprise a flexible, electrically conductive material that is coated or impregnated with an electrochromic material. In another embodiment, the fiber or fabric comprises a flexible, non-electrically conductive material that is rendered electrically conductive by coating or impregnating the non-electrically conductive material with electrically conductive material, which is subsequently coated with an electrochromic material.

When electrically conductive fibers are used, the fibers comprise an electrically conductive material, such as a metal, an electrically conductive organic material, or a combination thereof. Exemplary electrically conductive metals that can be formed into flexible fibers include silver, copper, gold, iron, iron alloy, aluminum, zinc, nickel, tin, and combinations comprising at least one of the foregoing metals. Exemplary electrically conductive organic materials that can be formed into flexible fibers include conjugated polymers such as poly (thiophene), poly(pyrrole), poly(aniline), poly(acetylene), poly(p-phenylenevinylene) (PPV), poly(3,4-ethylenedioxythiophene) poly(styrenesulfonate) (PEDOT-PSS), and similar materials.

When nonconductive fibers are used, the nonconductive fibers are coated or impregnated with a conductive material. Exemplary nonconductive fibers include those known for use in the manufacture of fabrics, including natural materials (e.g., cotton, silk, and wool) and synthetic organic polymers (e.g., poly(amide) (nylon), poly(ethylene), poly(ester), poly (acrylic), polyurethane (spandex), and poly(lactide). The coated fibers can be used as a fiber, or at least two coated fibers can be woven, knitted, crocheted, knotted, pressed, or plied to form a multi-filament fiber. It is also possible to have multiple nonconductive fibers formed into a yarn, and then coated with a conductive material. This construction can be used as a fiber, or be woven, knitted, crocheted, knotted, pressed, or plied to form a multi-filament fabric.

The electrically conductive fibers and fabrics (which as used herein include non-electrically conductive fibers rendered electrically conductive) are coated with an electrochromic material to provide an electrically conductive, electrochromic fiber. A wide variety of electrochromic materials are known and can be used, including inorganic materials such as transition metal oxides (e.g., vanadium, nickel, iridium, and tungsten oxide), fullerenes, Prussian blue (ferric ferricyanide); organometallic materials such as ferrocenes and ferrocenyl salts; and organic materials such as phthalocyanines, viologens, certain dyes, and conjugated polymers such as iodine-doped poly(acetylene), poly(thiophene), poly(phenylene), poly(phenylene sulfide), poly(pyrrole), and poly(aniline). Still other electrochromic materials are derived from silane precursors, norbornene precursors, and soluble conducting polymers. Desirable properties for the electrochromic polymer include a high degree of transparency in the visible color region in the "off" state (non-reduced or non-oxidized states, high absorption in visible spectral region upon electroreduction or electrooxidation ("on" state) (or in the case of multi-colored polymers, a high contrast between colored states), low electrochemical potential for reduction/oxidation, high stability in the "on" or "off" state (bi-stable), strong adsorption to the conductive fiber, color tunability by synthetic variation of the electrochromic precursor, low solubility of the electrochromic materials in common solvents, and low toxicity. Desirable electrochromic materials are those that undergo the highest contrast change upon oxidation or reduction, that is, from a colorless to a highly colored state, from a colored state to a colorless one, or from one colored state to another colored state upon oxidation and reduction.

In some embodiments, the electrochromic fibers and fabrics are further coated with an additional layer comprising an electrolyte material. In one embodiment the electrolyte material is a gel electrolyte. The gel electrolyte layer can be formed by coating a gel electrolyte precursor mixture comprising a gel electrolyte precursor. In particular, the gel precursor is a crosslinkable polymer. The gel precursor mixture also comprises an electrolyte. The electrolyte can be an alkali metal ion of Li, Na, or K. Exemplary electrolytes, where M represents an alkali metal ion, include $MClO_4$, $MPF_6$, $MBF_4$, $MAsF_6$, $MSbF_6$, $MCF_3SO_3$, $MCF_3CO_2$, $M_2C_2F_4(SO_3)_2$, $MN(CF_3SO_2)_2$, $MN(C_2F_5SO_2)_2$, $MC(CF_3SO_2)_3$, $MC_nF_{2n+1}SO_3$ ($2 \leq n \leq 3$), $MN(RfOSO_2)_2$ (wherein Rf is a fluoroalkyl group), MOH, or combinations of the foregoing electrolytes.

In some embodiments, a method of forming a flexible, electrochromic fiber or fabric comprises disposing an electrochromic material on a surface of an electrically conductive fiber or fabric to form an electrochromic layer on the surface of the electrically conductive fiber or fabric. The method can further comprise disposing an electrolyte composition on the electrochromic layer to form the flexible, electrochromic fiber or fabric. In a specific embodiment, disposing the electrochromic material comprises disposing a monomeric electrochromic precursor, and polymerizing the electrochromic precursor to form a polymeric electrochromic layer on the surface of the electrically conductive fiber or fabric; and disposing the electrolyte comprises disposing a mixture comprising a gel precursor and an electrolyte on the polymeric electrochromic layer, and polymerizing the gel precursor to form the flexible, electrochromic fiber or fabric. A plurality of the flexible, electrochromic fibers can be used to form an electrochromic fabric by weaving or entangling the plurality of flexible, electrochromic fibers.

In some embodiments, a method of forming a flexible, electrochromic fiber or fabric comprises disposing an electrically conductive, electrochromic material onto a non-electrically conductive fiber or fabric to form an electrically conductive electrochromic fabric. The method can further comprise disposing an electrolyte composition on the electrically conductive, electrochromic layer to form the flexible, electrochromic fiber or fabric. The non-electrically conductive fiber or fabric comprises a natural or synthetic non-electrically conductive organic polymer, specifically an elastic material, for example spandex. A flexible, electrochromic fabric can be formed from a plurality of the flexible, electrochromic fibers by weaving or entangling the plurality of flexible, electrochromic fibers. The electrochromographic device comprising the electrochromic fibers or fabrics can be reversibly stretchable.

In some embodiments, the electrochromic fibers and fabrics are used as part of garments or shoes. The color change portion comprising the electrochromic fibers or fabrics can be the entire garment or shoe, or a portion of the garment or shoe. The color change portion comprising the electrochromic fibers or fabrics can further be an integral part of the garment or shoe, or a detachable portion of the garment or shoe. In some embodiments, the electrochromic fiber or fabric is used as the material for the upper of shoes. In further embodiments, the garment or shoes may comprise two or more color change portions. For example, the upper of a shoe may be a color change portion. Further, the same shoe may have additional distinct color change portions that are attached to or separate from the shoe upper. Still further, the sole and/or side walls of the sole may comprise electrochromic fiber or fabric. Each of the color change portions of the shoe, including the upper and sole, may comprise electrochromic fiber or fabric.

In some embodiments, the color change portion comprises one or more electrochromic fiber electrodes. In another embodiment the color change portion comprises a second electrochromic fiber electrode. The first electrochromic fiber electrode and the second fiber electrode can be independently electronically addressable. The first electrochromic fiber electrode and second electrochromic fiber electrode can each display the same color or a different visible color in response to an applied electrical potential. Color change portions comprising electrochromic fibers or fabrics can display a still or animated color image.

In still another embodiment, a plurality of the electrochromic fibers can be used to manufacture a woven or nonwoven fabric wherein the individual electrochromic fibers are not independently addressed. In this embodiment, the fabric as a whole acts as a single addressable electrode. While these fabrics are generally in the form of a 2-dimensional woven or nonwoven planar sheet, their enhanced flexibility permits them to be shaped into 3-dimensional conformations such as a rolled sheet, a folded sheet, a twisted sheet, a coiled sheet, or other configuration.

A color change system can include provisions for powering one or more color change portions. In one embodiment, color change system 120 may include power storage device 126. Generally, power storage device 126 may be any device capable of storing power for color change system 120. In one embodiment, power storage device 126 may be a battery. In some embodiments, power storage device 126 could be a disposable battery. Examples of different types of disposable batteries include, but are not limited to: zinc-carbon, zinc-chloride, alkaline, silver-oxide, lithium disulfide, lithium-thionyl chloride, mercury, zinc-air, thermal, water-activated, nickel oxyhydroxide, and paper batteries. In another embodiment, power storage device 126 could be a rechargeable battery of some kind. Examples of rechargeable batteries include, but are not limited to: nickel-cadmium, nickel-metal hydride and rechargeable alkaline batteries. In still other embodiments, power storage device 126 could be another type of device capable of generating and storing electricity. For example, in one embodiment, power storage device 126 could be a piezoelectric device capable of generating and storing electricity.

A color change system can include provisions for controlling a color change portion. In one embodiment, color change system 120 may include control unit 124. In some embodiments, a control unit could be a central processing unit (CPU) of some kind. In other embodiments, a control unit could be a simple circuit of some kind for receiving electrical inputs and providing an electrical output according to the inputs. In one embodiment, control unit 124 may be a printed circuit board.

Control unit 124 may include a number of ports that facilitate the input and output of information and power. The term "port" means any interface or shared boundary between two conductors. In some cases, ports can facilitate the insertion and removal of conductors. Examples of these types of ports include mechanical connectors. In other cases, ports are interfaces that generally do not provide easy insertion or removal. Examples of these types of ports include soldering or electron traces on circuit boards.

In the current embodiment, control unit 124 can include port 131 for transmitting and/or receiving information from color change portion 122. In addition, in some cases, port 131 may include provisions for transmitting power to and/or receiving power from color change portion 122. Control unit 124 can include port 132 for transmitting and/or receiving information from power storage device 126. In addition, in some cases, port 132 may include provisions for transmitting power to and/or receiving power from power storage device 126. In an exemplary embodiment, control unit 124 can control color changes in color change portion 122 using energy from power storage unit 126. For example, in one embodiment, control unit 124 may send signals in the form of current changes and/or voltage changes to color change portion 122 to control the color of color change portion 122.

A color change system can include provisions for measuring one or more performance parameters associated with an article of footwear. The term "performance parameter" refers to any type of parameter that can be measured while an article of footwear is worn. For example, the number of heel strikes that occur while an article is worn is a performance parameter that may indicate the distance a user has traveled. As another example, the number of times a sole impacts the ground with a predetermined amount of force is a performance parameter that may indicate the number of times a basketball player jumps during a basketball game. Other performance parameters could include a temperature of a portion of the article, moisture in the article, as well as other possible parameters.

In some embodiments, color change system 122 can be configured with one or more sensors for measuring various performance parameters. Any type of sensors known in the art for measuring force, temperature, moisture as well as any other parameters could be used. In other embodiments, however, provisions for measuring performance parameters could be integrated into control unit 124. For example, in one embodiment, control unit 124 may include a force sensor that measures the number of times a sole impacts the ground. In still other embodiments, provisions for measuring performance parameters could be integrated into power storage device 126. For example, in embodiments where power storage device 126 is a piezoelectric device, the amount of energy generated by the device may be proportional to the number of heel strikes. With this arrangement, control unit 124 could approximately determine the number of steps taken by a user by monitoring the charging level of the piezoelectric device.

A color changing system can include provisions for changing the color of a color change portion to indicate the progress of a user in various athletic activities. In some cases, a control unit can be configured to detect changes in one or more performance parameters that are associated with a particular type of activity. In addition, a control unit can be configured to change the color of a color change portion as a performance parameter reaches a predetermined threshold.

Figure 2:
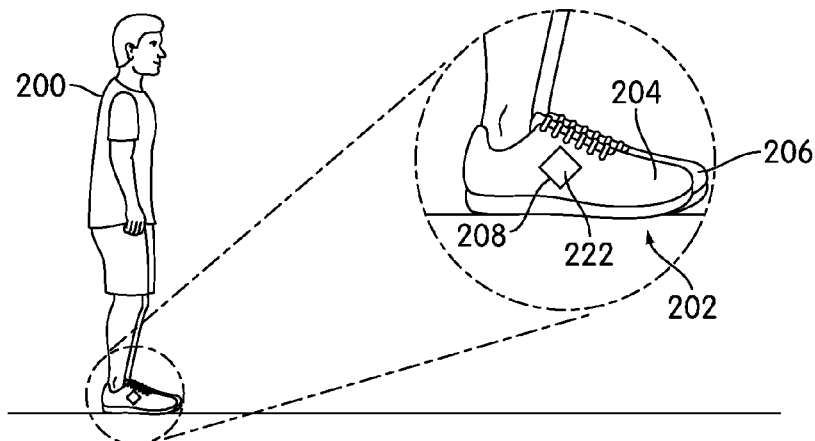
FIG. 2 is a schematic view of an embodiment of a user wearing an article of footwear with a color change portion.
Figure 3:
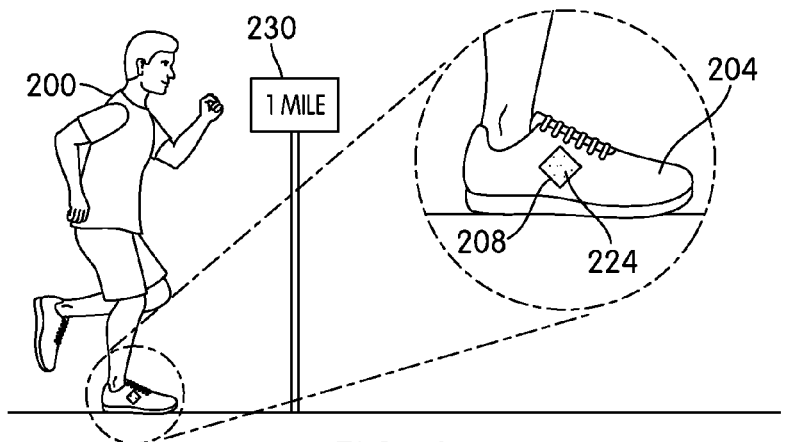
FIG. 3 is a schematic view of an embodiment of a user wearing an article of footwear with a color change portion.
Figure 4:
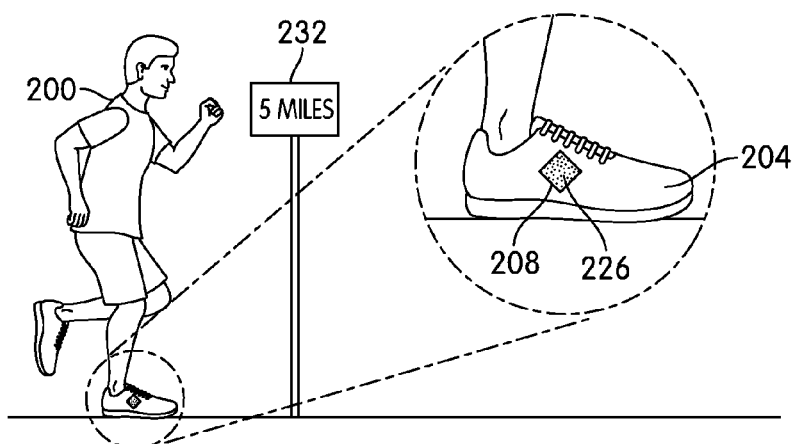
FIG. 4 is a schematic view of an embodiment of a user wearing an article of footwear with a color change portion.

FIGS. 2 through 4 illustrate an embodiment of a user wearing an article with a color change portion. Referring to FIGS. 2 through 4, user 200 is wearing pair of footwear 202. Pair of footwear 202 may comprise first article 204 and second article 206. In some cases, first article 206 may include first color change portion 208. For purposes of clarity, only first article 204 is shown with a color change portion, but it will be understood that in other embodiments second article 206 may also include a similar color change portion.

Initially, before user 200 begins running, first color change portion 208 may be display first color 222. Generally, first color 222 can be any color. In this example, first color 222 could be a white color. At a later time, as user 200 passes one mile marker 230, first color change portion 208 may change from first color 222 to second color 224. In this embodiment, second color 224 could be a yellow color. This transition may occur as a control unit (not shown) of first article 204 determines that user 200 has taken a predetermined number of steps. In some cases, the control unit may be calibrated to change the color of color change portion 122 to a yellow color after approximately 2,000 steps, which roughly corresponds to 1 mile. Following this, as user 200 passes five mile marker 232, color change portion 208 may change from second color 224 to third color 226. In this embodiment, third color 226 could be an orange color. This transition may occur as the control unit of first article 204 determines that user 200 has taken approximately 10,000 steps, which corresponds to approximately 5 miles.

Using this arrangement, a color change portion may be colored to indicate various milestones in the running performance of a user. In the illustrated embodiment, this arrangement could allow user 200 to monitor his or her progress on a run by viewing the color of the color change portion. Also, this arrangement alerts other runners to the progress of user 200. In some cases, the color change portion may function in a similar manner to patches, ribbons, or other objects that are used to visually signify accomplishments in various athletic endeavors.

Figure 5:
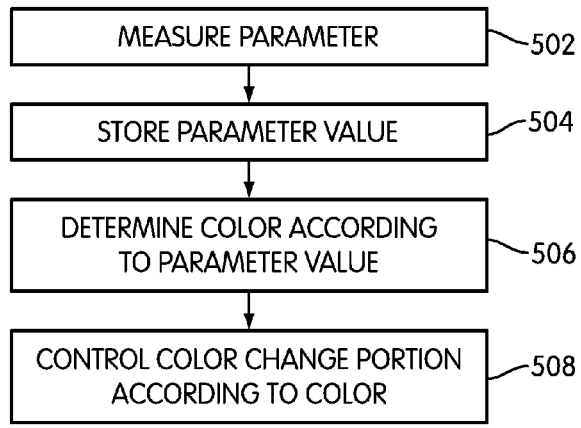
FIG. 5 is an embodiment of a process for controlling a color change portion.

FIG. 5 illustrates an embodiment of a generic process for controlling a color change portion. In this embodiment, the following steps may be performed by control unit 124; however in some embodiments these steps may be performed by additional systems or devices associated with article 100. For example, in some cases including sensors or devices for measuring various performance parameters, one or more steps could be performed by the sensors or devices. In addition, in embodiments where article 124 is in communication with a computer, one or more of the steps could be performed by the computer. In addition, it will be understood that in other embodiments one or more of the following steps may be optional.

During step 502, control unit 124 may measure a performance parameter. The performance parameter could be any parameter including, but not limited to: the number of heel strikes, the number of steps taken, the number of jumps performed, the temperature of a region of the article, the moisture of a region of the article, as well as any other performance parameter. In one embodiment, for example, a piezoelectric device may be used to generate a predetermined amount of electricity with each heel strike. In this embodiment, control unit 124 could be configured to measure the number of heel strikes by determining the total amount of electricity generated by the piezoelectric device. In another embodiment, a stand along sensor could be used for detecting heel strikes or other performance parameters. Next, during step 504, control unit 124 may store the parameter value. In some cases, the parameter value could be stored in memory associated with the control unit. In other cases, the parameter value could be stored in memory associated with a sensor or other device of the article.

Following step 504, control unit 124 may proceed to step 506. During step 506, control unit 124 may determine a color according to the parameter value. In some cases, control unit 124 could assign continuous color values to each parameter value. In other cases, control unit 124 may assign different colors to discrete ranges of a parameter value. For example, in the embodiment discussed above, control unit 124 may use a white color when the number of heel strikes is less than 2,000. Additionally, control unit 124 may use a yellow color when the number of heel strikes is between 2,000 and 10,000. In other embodiments, control unit 124 could determine a color according to the parameter value in any other manner.

Next, during step 508, control unit 508 may control the color change portion according to the color determined during step 506. For example, if during step 506 control unit 124 determines a white color for a parameter value of 1,500 heel strikes, control unit 124 may control the color change portion to have a white color. On the other hand, as the number of heel strikes changes from 1,999 to 2,000 control unit 124 may change the color of the color change portion from white to yellow.

It will be understood that control unit 124 may be configured to control the color of the color change portion using active or passive methods. In some cases, control unit 124 may actively maintain a color for a color change portion by continuously sending electric signals (in the form of currents or voltages) to the color change portion. In other cases, control unit 124 may passively control a color change portion by only sending electric signals to the color change portion when a color change (or color shift) is needed. The use of either passive or active control methods may vary according to the type of color change technology used. In addition, some technologies could make use of a combination of active and passive control methods.

Figure 6:
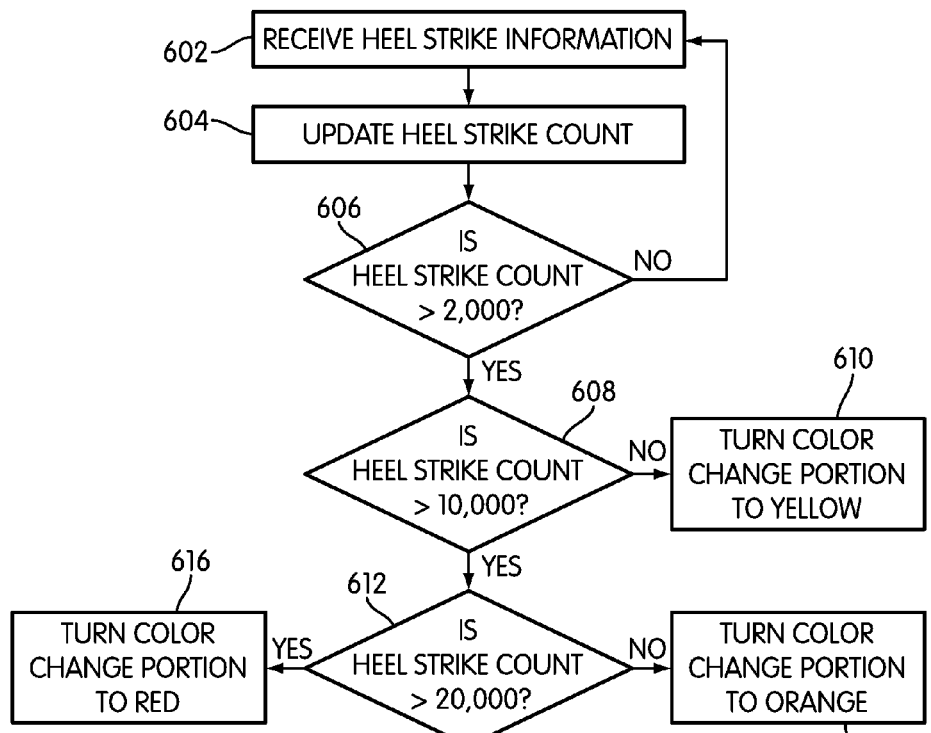
FIG. 6 is an embodiment of a process for controlling a color change portion.

FIG. 6 illustrates an embodiment of a specific method for controlling a color change portion. In particular, FIG. 6 illustrates a method that could be used to control a color change portion in the manner illustrated in FIGS. 2 through 4. In this embodiment, the following steps may be performed by control unit 124; however in some embodiments these steps may be performed by additional systems or devices associated with article 100. For example, in some cases including sensors or devices for measuring various performance parameters, one or more steps could be performed by the sensors or devices. In addition, in embodiments where article 124 is in communication with a computer, one or more of the steps could be performed by the computer. In addition, it will be understood that in other embodiments one or more of the following steps may be optional.

During step 602, control unit 124 may receive heel strike information. In particular, control unit 124 could receive information related to a heel strike event. In some cases, heel strike information can be received from a stand alone heel strike sensor. In other cases, heel strike information can be received from a power storage device, such as piezoelectric device that may be configured to generate power during heel strikes. In still other cases, heel strike information can be received from any other device capable of measuring heel strike information.

Following step 602, during step 604, control unit 124 may update a heel strike count, which is a variable that keeps track of the total number of heel strike events that have occurred. Next, during step 606, control unit 124 may determined if the heel strike count is greater than 2,000. If the heel strike count is less than 2,000, control unit 124 may return to step 602 to receive new heel strike information. If, however, the heel strike count is greater than 2,000, control unit 124 may proceed to step 608. During step 608, control unit 124 may determine if the heel strike count is greater than 10,000. If so, control unit 124 may proceed to step 612. Otherwise, control unit 124 may proceed to step 610. During step 610, control unit 124 turns the color change portion to yellow. In situations where the color is already yellow, no color change may occur and control unit 124 may continue to operate the color change portion in a yellow color state. If however, the color is not initially yellow, control unit 124 changes the color change portion to a yellow color.

During step 612, control unit 124 determines if the heel strike count is greater than 20,000. If not, control unit 124 proceeds to step 614. During step 614, control unit 124 turns the color change portion to an orange color. If, during step 612, control unit 124 determines that the heel strike count is greater than 20,000, control unit 124 may proceed to step 616, where control unit 124 turns the color change portion to a red color.

It will be understood that in other embodiments, different threshold values could be selected. As discussed above, the exemplary embodiment uses heel strike thresholds of 2,000, 10,000 and 20,000 corresponding to approximately 1 mile, 5 mile and 10 mile distances. In other embodiments, however, a color change portion may change color according to any other threshold values. In other cases, for example, a color change portion may be configured to change color after every 1,000 heel strikes. In still other cases, a color change portion may be configured to change color after every 100,000 heel strikes.

Figure 7:
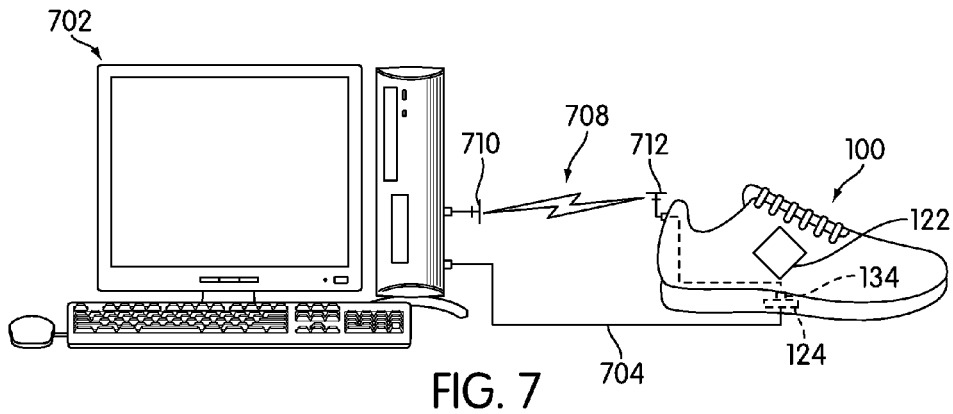
FIG. 7 is a schematic view of an embodiment of an article with a color change portion in communication with a computer.
Figure 8:
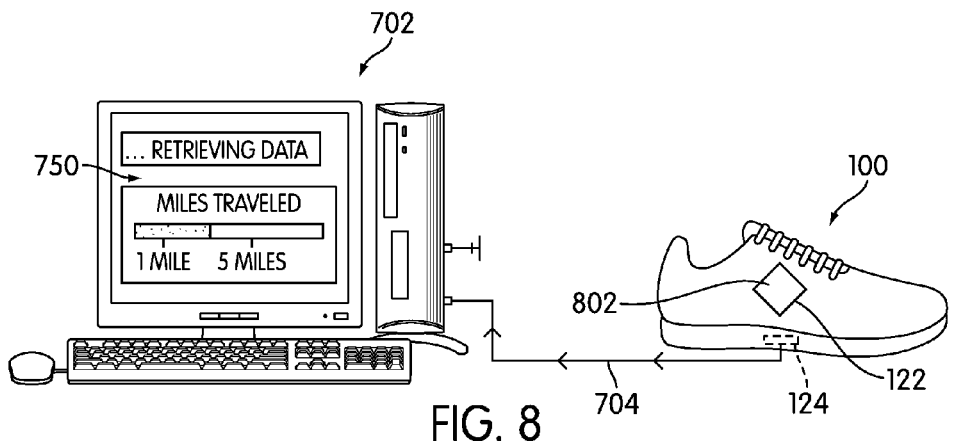
FIG. 8 is a schematic view of an embodiment of an article with a color change portion in communication with a computer.
Figure 9:
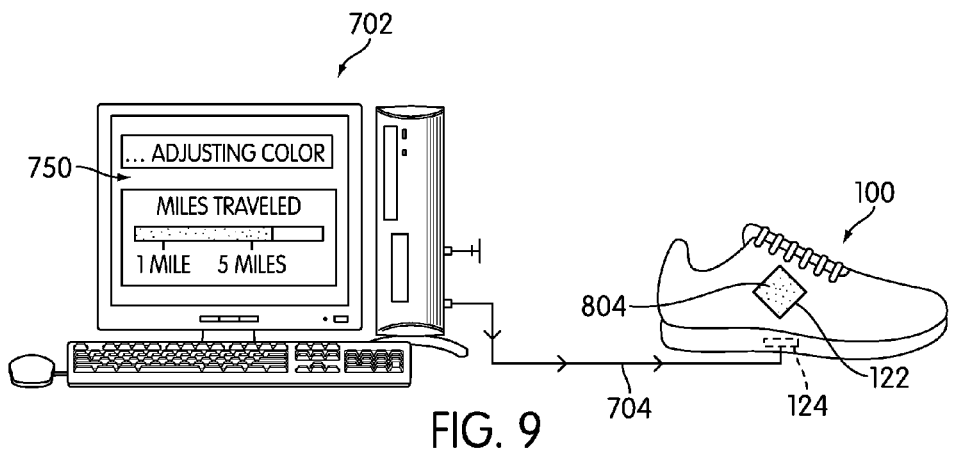
FIG. 9 is a schematic view of an embodiment of an article with a color change portion in communication with a computer.

FIGS. 7 through 9 illustrate embodiments of a system for controlling a color change portion using a computer or similar device. Referring to FIGS. 7 through 9, article 100 may be connected directly to computer 702. Generally, computer 702 could be any type of computing device including, but not limited to a desktop computer or a laptop computer. In addition, the term computer can also include any other device that includes a display and a processor. Examples of such devices include, but are not limited to: PDA's, tablet computers, cell phones, as well as other types of devices.

In some embodiments, article 100 may be connected to computer 702 using wired connection 704. Generally, wired connection 704 can be any cable or collection of wires that can be used to exchange information between article 100 and computer 702. In addition, wired connection 704 may be configured to transfer power between article 100 and computer 702. In some cases, wired connection 704 could be used to charge a power storage device of article 100. Furthermore, wired connection 704 could be associated with any type of connection. For example, in one embodiment, wired connection 704 could be a USB cable that can be used to exchange information between computer 702 and article 100 as well as to provide power to article 100. In other cases, any other type of connection could be used. For example, in another embodiment, an IEEE 13394 interface (a fire wire) could be used for data transfer.

In some embodiments, article 100 may be connected to computer 702 using wireless connection 708. In some cases, computer 702 may include first antenna 710 for transmitting and receiving information. In addition, in some cases, article 100 may include second antenna 712 for transmitting and receiving information. It will be understood that second antenna 712 is optional and may not be included in all embodiments. Furthermore, in embodiments where an antenna is used with article 100, control unit 124 may include a port for transmitting information to and/or receiving information from the antenna. In the current embodiment, control unit 124 includes port 134 that is in communication with second antenna 712.

Generally, wireless connection 708 could be any type of wireless connection supporting any type of wireless communication. In some cases, computer 702 and article 100 may communicate using a wireless network. Examples of such networks include, but are not limited to: personal area networks, local area networks, wide area networks, client-server networks, peer-to-peer networks, as well as other types of networks. In other cases, wireless connection 708 could utilize the blue tooth wireless protocol. In still other cases, wireless connection 708 may use other short range wireless technologies such as wireless USB.

For purposes of clarity, article 100 and computer 702 are shown as being disposed adjacent to one another in the current embodiment. In other embodiments, however, article 100 may be remotely connected to computer 702 using a wireless network. Moreover, in some cases, article 100 could be connected to computer 702 using a packet-switched communication system such as the Internet.

In some embodiments, a color change system can be associated with a software interface that may be run on a computer. The term "software interface" refers to any computer program or collection of computer programs that may be used as an interface for inputting information to, or receiving information from, a color change system. In some cases, software for interfacing with a color change system could be stored on a computer. In other cases, software for interfacing with a color change system could be associated with a control unit for an article that is accessed through a computer when the article is connected to the computer. This arrangement allows software for interfacing with a color change system to be used with any computer that is capable of connecting with the article.

In some embodiments, a color change system can include provisions for automatically controlling a color change portion whenever an article is connected to a computer. In one embodiment, for example, a computer may be configured to download information related to a performance parameter and control the color change portion according to the value of the performance parameter.

Referring to FIGS. 8 and 9, article 100 may be connected to computer 702 using wired connection 704. As article 100 is connected to computer 702, computer 702 may be configured to automatically download information related to one or more performance parameters. In the exemplary embodiment, computer 702 may download information from control unit 124 related to heel strikes, which may be used to estimate the number of miles traveled by the user. Initially, when article 100 is first connected, the number of miles traveled is between 1 mile and 5 miles. In some cases, this information could be displayed using software interface 750. At this point, color change portion 122 has first color 802. Once the performance parameter information is fully downloaded, computer 702 displays an updated record of the miles traveled using software interface 750. In this case, the user has traveled over 5 miles. Therefore, computer 702 sends a signal to control unit 124 to change color change portion 122 to second color 804. Thereafter, a user may disconnect article 100 and color change portion 122 may continue to display second color 804.

Using the arrangement illustrated in FIGS. 8 and 9, color change portion 122 may be automatically controlled using computer 702. In some cases, this system can help reduce the computational required by control unit 124. This arrangement could save manufacturing costs since the primary computational power is performed by computer 702 rather than control unit 124.

In some embodiments, a color change system can include provisions for manually controlling a color change portion. In some cases, an article can be associated with one or more control buttons that are used to manually control colors of a color change portion. In addition, in some cases, an article can be associated with a reset button that resets the value of a performance parameter. For example, a user may want to restart tracking his or her performance. One or more control buttons could be provided directly on a portion of an article with a color change portion or they could be provided on a remote control that is in communication with a control unit of the color change system. In addition, provisions for manually controlling a color change system could be provided as part of a software interface for the color change system. For example, in embodiments where color change is controlled by a computer, a software interface can include provisions for clearing or resetting a performance parameter.

A color change system can include provisions for increasing the level of control over a color change portion. In some cases, an article including a color change portion can be controlled according to various types of external input. In some cases, the input may be received directly from a user. In other cases, the input could be received from other sources.

Figure 10:
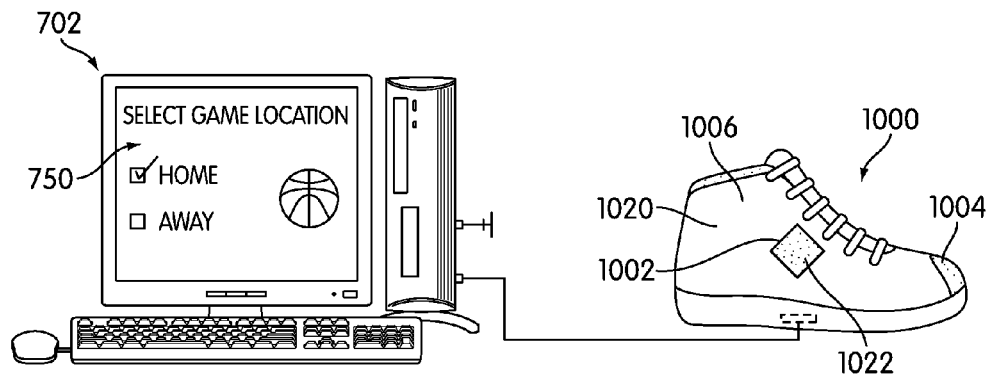
FIG. 10 is a schematic view of an embodiment of an article with a color change portion in communication with a computer.
Figure 11:
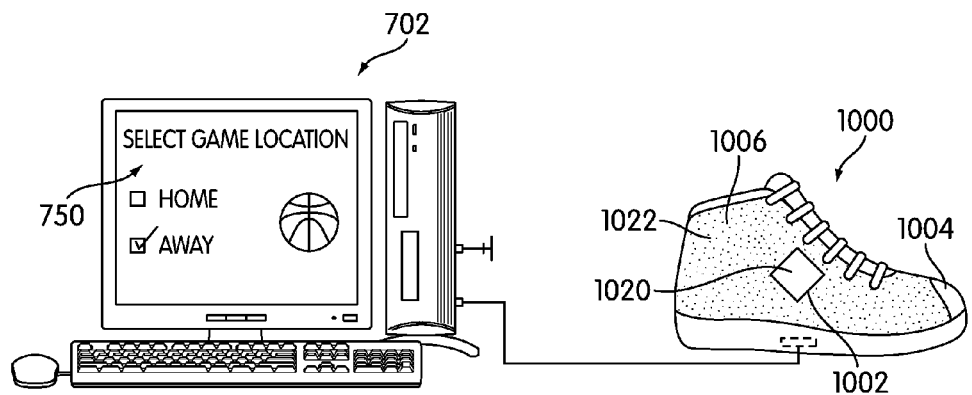
FIG. 11 is a schematic view of an embodiment of an article with a color change portion in communication with a computer.

FIGS. 10 through 11 illustrate an embodiment of a color change portion that is controlled according to user input information. Referring to FIGS. 10 and 11, article 1000 may be a basketball shoe. In addition, article 1000 includes first color change portion 1002 in the form of a logo as well as second color change portion 1004 in the form of trim. Furthermore, article 1000 includes third color change portion 1006 that comprises the substantial majority of the upper. As previously discussed, each color change portion can be configured with various colors, including patterns and/or patterns.

In some embodiments, the upper of article 1000 may be formed of a color changing material or fabric. In other words, third color change portion 1006 may be the upper itself, or a substantial majority of the upper. In other embodiments, third color change portion 1006 may be a discrete component or layer attached to the upper. Further, in some embodiments, third color change portion 1006 may be formed of electrochromic fiber or fabric.

Similarly, first color change portion 1002 may be formed of the upper material itself, or it may be a discrete component or layer attached to the upper. In some embodiments, first color change portion 1002 may be formed of electrochromic fiber or fabric. Also, second color change portion 1004 may be formed of the upper material itself, or it may be a discrete component or layer attached to the upper. In some embodiments, second color change portion 1004 may be formed of electrochromic fiber or fabric.

In this case, article 1000 is connected to computer 702. In this embodiment, computer 702 may prompt a user to select the type of game location for an upcoming basketball game that the user will attend. Referring to FIG. 10, the user may select "home" using software interface 750, indicating that the game is a home game. Since home teams traditionally wear white, computer 702 may send a control signal to article 1000 to color third color change portion 1006 with first color 1020. In the exemplary embodiment, first color 1020 may be a white color. In addition, computer 702 may control first color change portion 1002 and second color change portion 1004 to display second color 1022. In some cases, second color 1022 could be a non-white color. For example, if the basketball team of the user has red as a team color, second color 1022 could be red. With this arrangement, the majority of article 1000 may be colored white while the logo and trim may be colored with a team color.

Referring to FIG. 11, at another time, if a user selects "away" using software interface 750, indicating that the game is an away game, computer 702 may control third color change portion 1006 to have second color 1022. In addition, computer 702 may control first color change portion 1002 and second color change portion 1004 to have first color 1022. With this arrangement, the majority of article 1000 may be colored with a team color while the logo and trim may be colored white.

A color change system can include provisions for applying user selected colors and/or predetermined designs to an article including one or more color change portions. In some embodiments, a color change system may include provisions for allowing a user to input a user selected color. Upon receiving the user selected color, a control unit may be configured to change the color change portion to the user selected color. For example, in embodiments where an electrochromographic material is used with the color change portion, a control unit may apply a predetermined current and/or voltage to the color change portion to change the color of the color change portion from an initial color to the user selected color. In other embodiments, a color change system may include provisions for applying multiple colors to one or more color change portions according to a design for an article of footwear that incorporates multiple colors.

Figure 12:
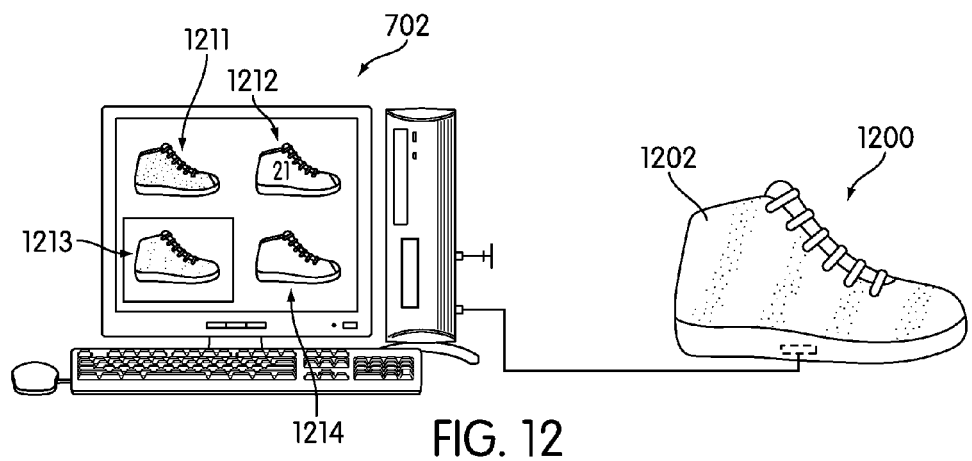
FIG. 12 is a schematic view of an embodiment of an article with a color change portion in communication with a computer.

Referring to FIG. 12, article 1200 includes color change portion 1202 that comprises a substantial majority of the upper. In some embodiments, the upper of article 1200 may be formed of color change portion 1202. In other embodiments, color change portion 1202 may be a discrete component or layer attached to the upper. In further embodiments, color change portion 1202 may comprise electrochromic fiber or fabric.

As shown in FIG. 12, article 1200 is connected to computer 702. In this case, a user may be presented with four predetermined designs including first design 1211, second design 1212, third design 1213 and fourth design 1214. In this case, a user has selected third design 1213 that comprises a stripe-like pattern. As the user selects third design 1213, computer 702 may send a control signal to article 1200 that colors color change portion 1202 with the selected design. In particular, in embodiments where a color change portion comprises an electrochromographic material, a control unit may send an electrical signal to color change portion 1202 to change one or more colors of color change portion 1202 so that color change portion 1202 is configured to the selected design.

Although only four designs are illustrated in this embodiment, other embodiments could include additional designs. In some cases, designs can be imported into software interface 750 manually by a user. In other cases, designs could be included in a software package. In still other cases, a user could create a design using any type of graphic software.

It will be understood that a color change portion may not be restricted to the upper of an article. In other cases, a color change portion could be associated with any other portion of an article. For example, in some cases, a sole of an article may comprise one or more color change portions that allow the color of the sole to be varied. In other cases, lacing associated with an article could be configured with a color change portion so that the color of the lacing can be varied. In still other embodiment, any other portions of an article could be associated with color change portions. As another example, in some cases, an insert for an article could comprise one or more color change portions.

Figure 13:
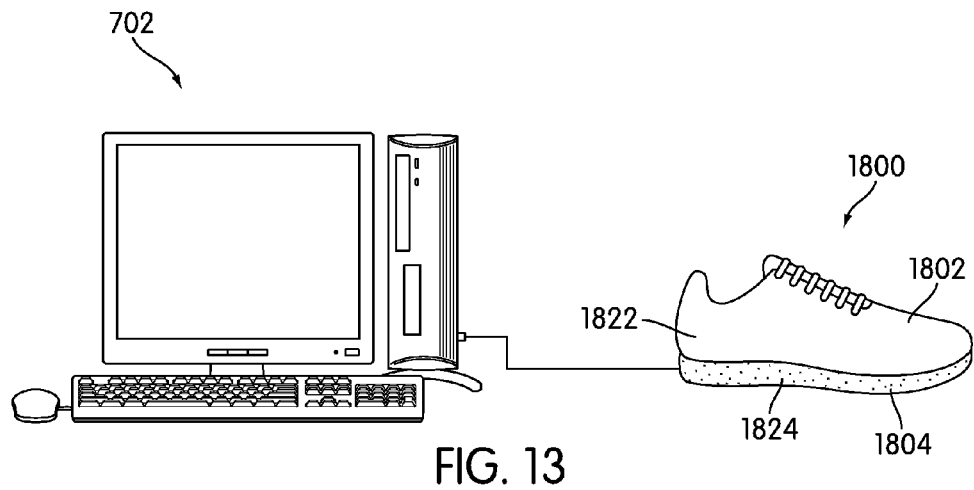
FIG. 13 is a schematic view of an embodiment of an article with a color change portion in communication with a computer.

Referring to FIG. 13, article 1800 includes upper 1802 and sole 1804. In addition, article 1800 includes first color change portion 1822 and second color change portion 1824. First color change portion 1822 may comprise a substantial majority of upper 1802. In some embodiments, the upper of article 1800 may be formed of first color change portion 1822. In other embodiments, first color change portion 1822 may be a discrete component or layer attached to the upper. In some embodiments, first color change portion 1822 may comprise electrochromic fiber or fabric. Furthermore, second color change portion 1824 may comprise a substantial majority of sole 1804. In some embodiments, second color change portion 1824 may be the sole of article 1800, or a discrete component or layer attached to the sole. In some embodiments, second color change portion 1824 may comprise electrochromic fiber or fabric. With this configuration, first color change portion 1822 and second color change portion 1824 can be used to change the colors of a substantial entirety of article 1800.

Figure 14:
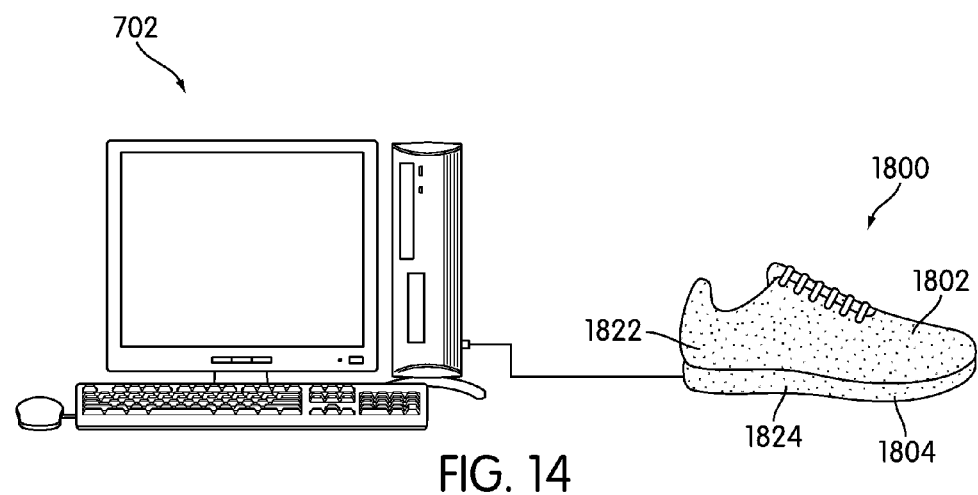
FIG. 14 is a schematic view of an embodiment of an article with a color change portion in communication with a computer.

In some cases, as shown in FIG. 13, second color change portion 1824 may be colored differently from first color change portion 1822. As shown in FIG. 14, however, in some cases, first color change portion 1822 and second color change portion 1824 could have substantially similar colors. This arrangement provides a user with the ability to change substantially any portion of article 1800. Furthermore, it will be understood that in other cases, different regions of first color change portion 1822 and second color change portion 1824 could have different colors.

A color change system can include provisions for automatically coloring an article according to information received about other objects that may be worn or otherwise associated with a user. In some embodiments, a color change system can include provisions for receiving information related to a first color of an object associated with the user. In addition, a color change system can include provisions for determining a second color for the color change portion according to the first color. For example, in some cases, a color change system can determine a second color that color coordinates with the first color. In embodiments where the color change portion comprises an electrochromographic material, a control unit may send an electrical signal to the color change portion to change the color of the color change portion to the second color.

In some cases, a color change system may receive information about the color of one or more articles configured to be worn by a user and may determine a color for a color change portion according to the colors of the other articles.

Figure 15:
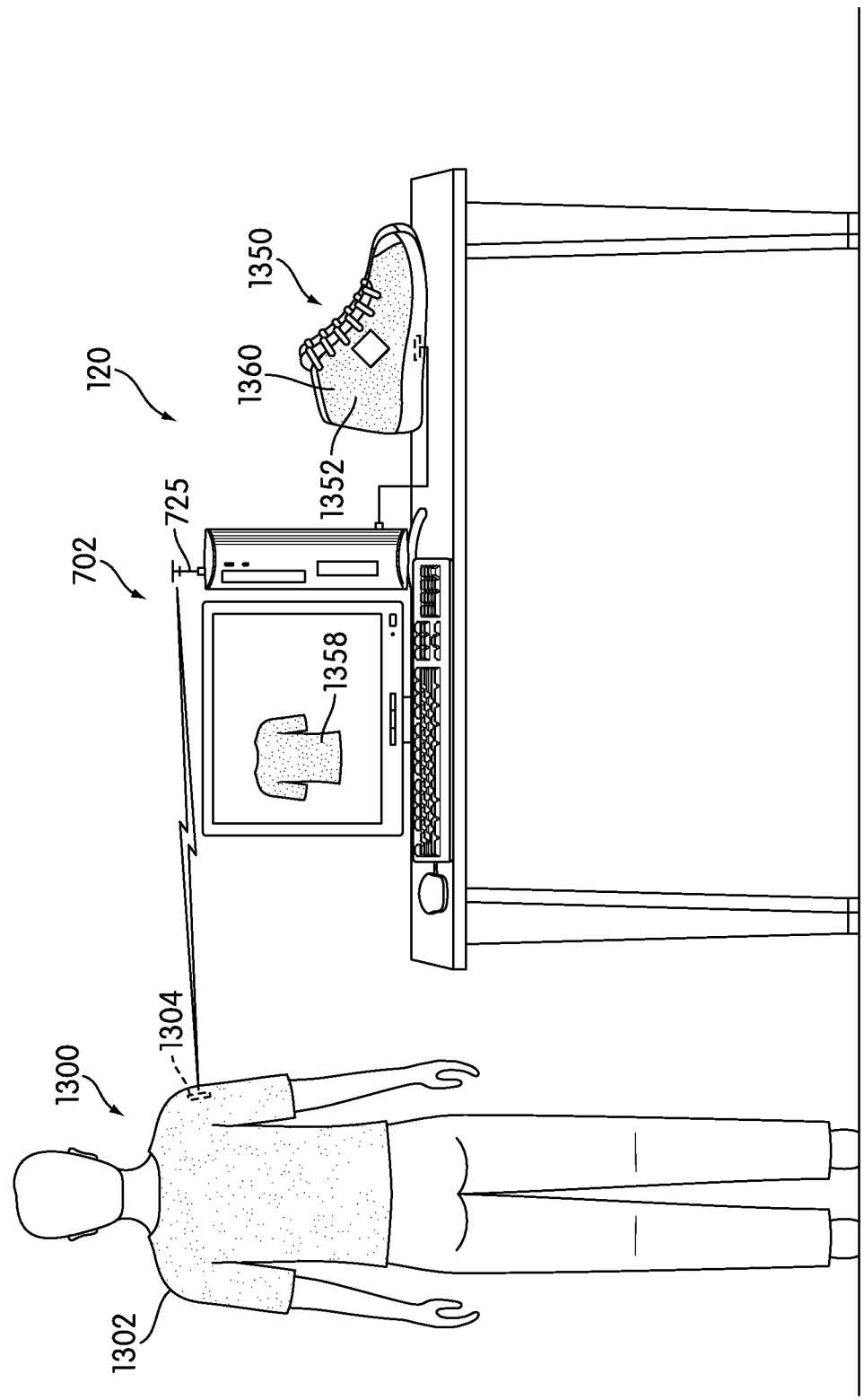
FIG. 15 is a schematic view of an embodiment of a method of detecting an article of clothing for use with a color change system.

FIG. 15 illustrates an embodiment of color change system 120. Referring to FIG. 15, user 1300 may wear shirt 1302. In some cases, shirt 1302 may be equipped with electronic identification device 1304. The term "electronic identification device" refers to any object applied to or incorporated into an article for purposes of identifying the object. As an example, in some cases, electronic identification device 1304 could be a radio-frequency identification (RFID) tag. In cases where electronic identification device 1304 is an RFID tag, electronic identification device 1304 could be either an active tag or a passive tag.

In this case, computer 702 may be equipped with antenna 725 that is capable of receiving a transmission from device 1304. Computer 702 may use the signal received from electronic identification device 1304 to identify shirt 1302. In particular, the identifying information may include the type of article as well as the color of the article. In this case, computer 702 determines that shirt 1302 is associated with first color 1358. Following this, computer 702 may determine a coloring scheme for article 1350 that coordinates with first color 1358. In this case, computer 702 selects second color 1360 for article 1350 that will color coordinate with shirt 1302. In particular computer 702 controls color change portion 1352 to change to second color 1360. In embodiments where color change portion 1352 comprises an electrochromographic material, a control unit associated with color change portion 1352 may apply an electrical signal to color change portion 1352 to change color change portion 1352 to second color 1360. With this arrangement, a user can easily color coordinate his or her shoes with other articles of clothing being worn. It will be understood that while the current embodiment discusses coordinating the color of an article of footwear with a shirt, other embodiments could include provisions for coordinating footwear colors with any other articles including, but not limited to: shirts, pants, socks, hats, scarves as well as accessories or other objects that may be worn or carried. Examples of other objects that could be coordinated include, but are not limited to: any type of equipment, such as sporting equipment, back packs, bags, luggage, as well as any other objects for which it may be desirable to color coordinate.

Figure 16:
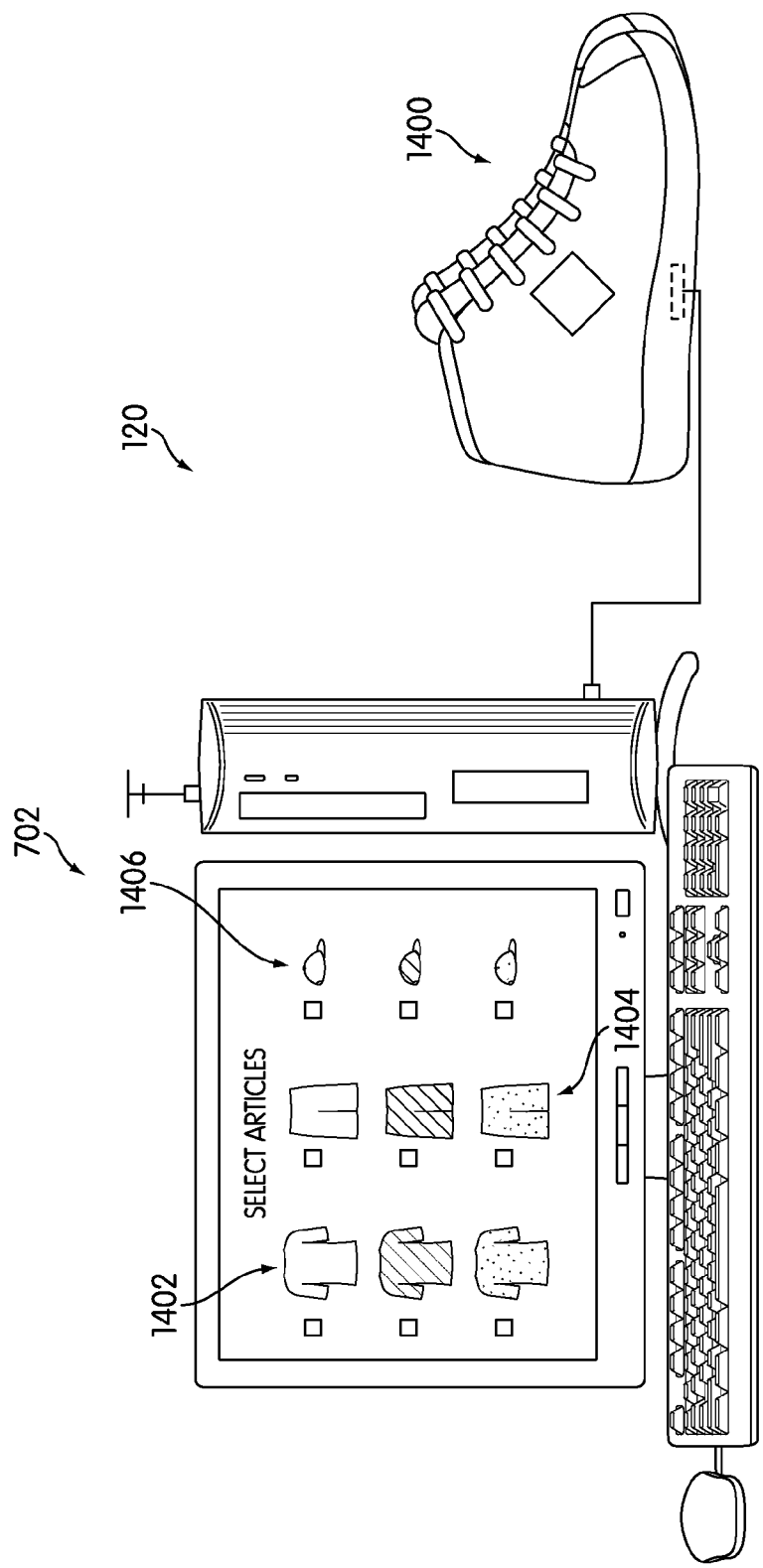
FIG. 16 is a schematic view of an embodiment of a method of selecting articles of clothing for purposes of controlling a color change system.

Referring to FIG. 16, a user can manually select articles from a list of articles for purposes of coordinating with footwear. In this embodiment, a user may select articles from shirt list 1402, pant list 1404 and hat list 1406. After a user has selected one or more articles to be worn, color change system 120 may be configured to automatically change one or more color change portions of article 1400 to coordinate with the selected articles.

The list of articles discussed in this embodiment could be generated in any manner. In some cases, a user could manually create a list of articles. In one embodiment, a color change program could include general article categories such as shirts, pants and hats. Within each category, a user could create an entry for each article owned and assign a color to each entry. For example, a user could create a first entry for a short sleeve t-shirt and select the color for the shirt manually. This could be accomplished by any method including having the user select the color from a color chart or having the user scan a portion of the article in using a scanner. In another embodiment, a list of articles could be generated by having a user scan in the bar codes from sales tags of newly purchased articles. In still another embodiment, articles could be provided with other tags or information that can be scanned in or manually entered into a color change program by a user. In still other embodiments, a user may have access to a database of various clothing articles from different manufacturers.

Figure 17:
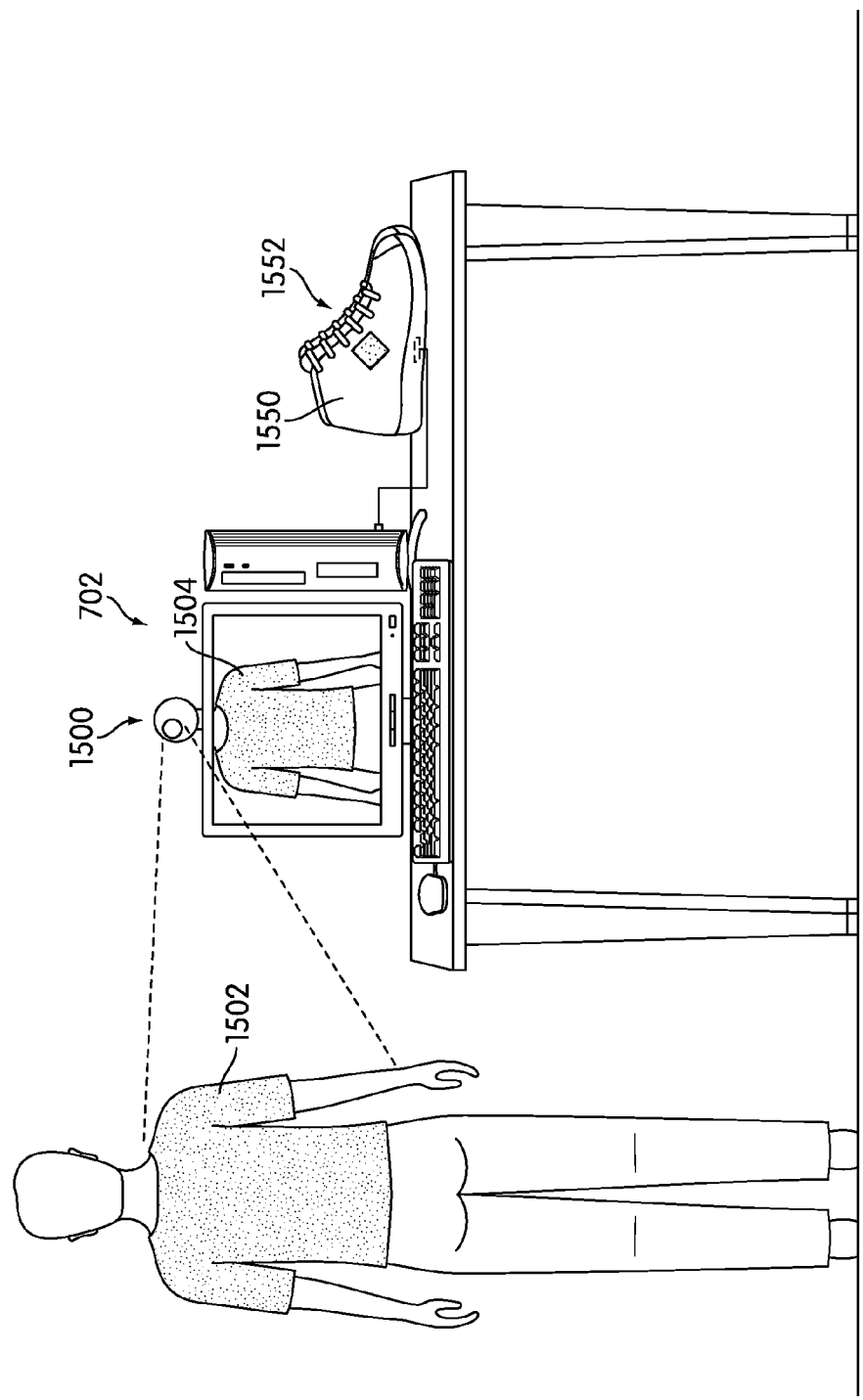
FIG. 17 is a schematic view of an embodiment of a method of detecting an article of clothing for purposes of controlling a color change system.

FIG. 17 illustrates an embodiment of another method of determining the color of clothing worn by a user. Referring to FIG. 17, computer 702 may be equipped with camera 1500. Generally, camera 1500 can be any type of imaging device configured to communicate with computer 702 including a digital camera, a camcorder, a scanner, as well as any other imaging device. In an exemplary embodiment, camera 1500 may be a web-cam.

In this case, a user may have a picture taken of shirt 1502 using camera 1500. This picture may be stored on computer 702 as image 1504. In addition, computer 702 may be configured to analyze image 1504 to determine the color of the clothing. For example, computer 702 may determine that shirt 1502 has a red color. Using this information, computer 702 could control color change portion 1550 of article 1552 to have a red color to match shirt 1502.

It will be understood that the embodiments discussed above are not intended to be limited to use with particular types of sensors for identifying clothing color. In other embodiments, other types of sensors can be used for detecting colors of clothing worn by a user.

A color change system may be configured to automatically determine one or more colors for a color change portion of an article of footwear according to the colors of various other articles of clothing worn by a user. In some embodiments, a color change system may color a color change portion with the same colors used in one or more articles of clothing worn by a user. In other embodiments, however, a color change system may use different colors from the colors detected in one or more articles worn by a user. In some cases, for example, a color change system may color a color change portion with a coordinating color that matches colors in other articles worn by the user. In other cases, a color change system may purposefully select clashing colors for a color change portion that do not match with colors in other articles worn by the user. In still other cases, a color change system can use any rules for determining one or more colors for a color change portion according to the colors of other articles worn by a user.

A color change system can be associated with one or more color designs. The term "color design" refers to any collection of information that can be used by a color change system to determine how to color one or more color change portions of an article. In some cases, color designs could be stored in standardized file formats that could be easily read by software associated with a color change system. By using standardized file formats color designs could be easily created by third parties and exchanged between different users. In other embodiments, however, a color design may not be associated with a standardized format and could generally include information regarding specific colors to use for various color change portions on an article of footwear.

Figure 18:
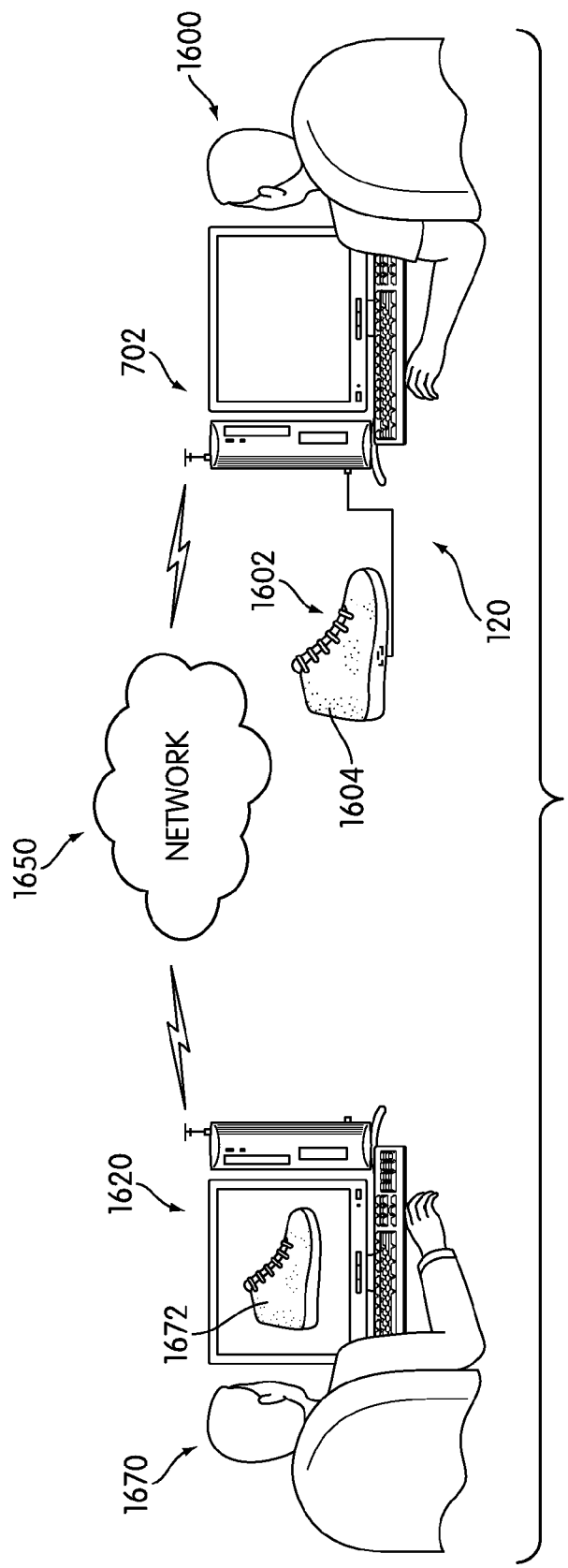
FIG. 18 is a schematic view of an embodiment of a method of transferring color designs using a color change system.

A color change system can include provisions for allowing a second party to create a color design and send a color design to a user with an article having a color change portion. Referring to FIG. 18, user 1600 has access to computer 702 and article 1602. Article 1602 further includes color change portion 1604 that comprises a substantial majority of the upper of article 1602. In addition, computer 702 is in communication with remote computer 1620 via network 1650.

Generally, network 1650 may be a system allowing for the exchange of information between computer 702 and remote computer 1620. Examples of such networks include, but are not limited to: personal area networks, local area networks, wide area networks, client-server networks, peer-to-peer networks, as well as other types of networks. Additionally, the network may support wired transmissions, wireless transmissions, or both wired and wireless transmissions. In some embodiments, network 1650 may be a packet-switched communications system. In a preferred embodiment, network 1650 may be the Internet.

In some embodiments, designer 1670 may use remote computer 1620 to create a color design for an article with a color change portion. In one example, designer 1670 could be a professional designer. With this arrangement, designer 1670 may submit color design 1672 for an article to user 1600 via network 1650. Upon receiving color design 1672, color change system 120 may be configured to automatically color article 1602 according to color design 1672.

Figure 19:
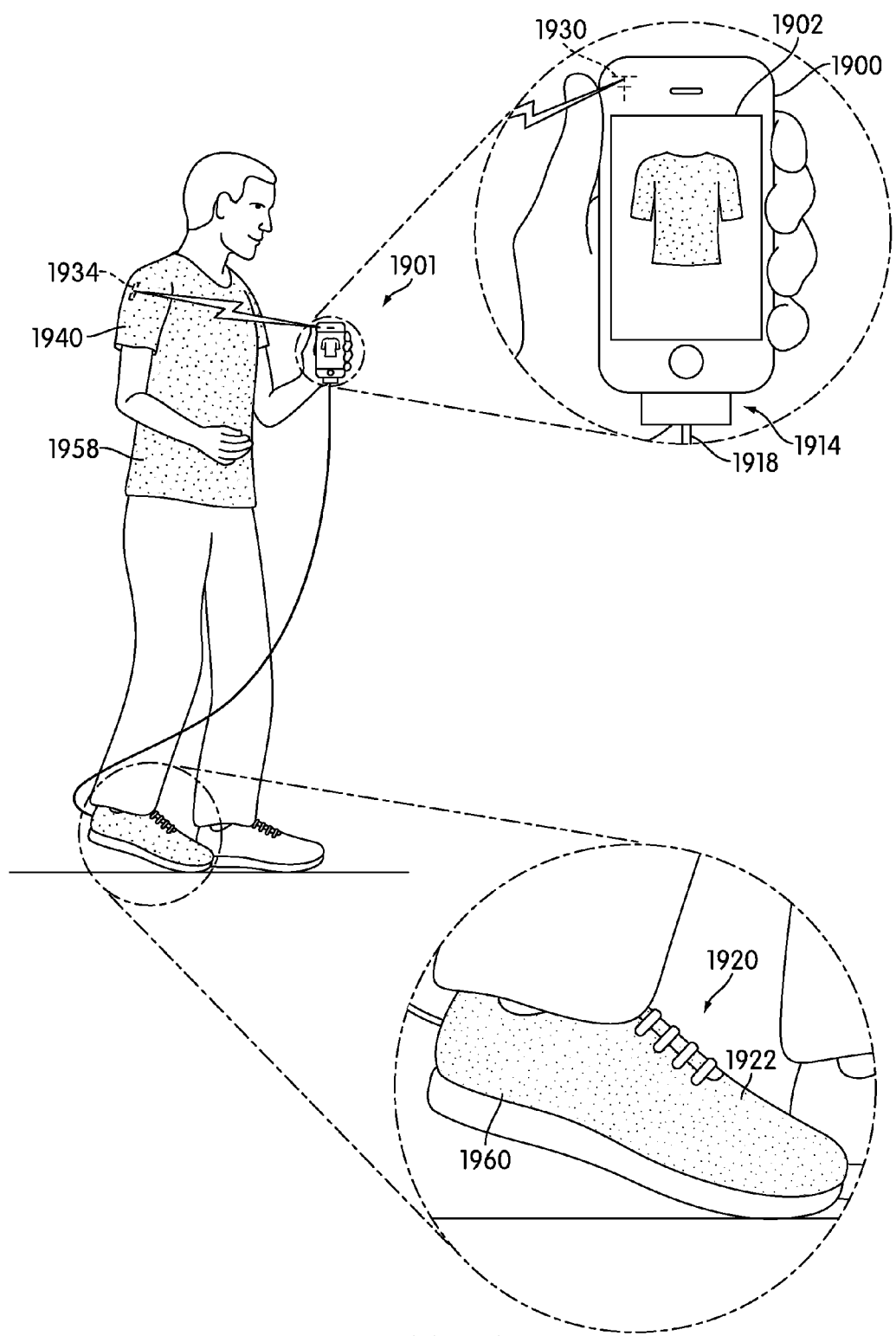
FIG. 19 is a schematic view of an embodiment of a method of detecting an article of clothing for use with a color change system using a mobile device.

FIG. 19 illustrates a schematic view of an embodiment of color change system 1901 that utilizes one or more features of mobile device 1900. Generally, a mobile device could be any device that is portable and that may be used by an athlete or user to obtain training instructions. Examples of different mobile devices include, but are not limited to: mobile phones, digital music players, portable digital assistants (PDAs), portable gaming machines, tablet computers, ultraportable laptops as well as any other kinds of mobile devices. In the exemplary embodiment, mobile device 1300 may be an iPad, iPhone or iPod manufactured by Apple Computer, Inc.

Mobile device 1900 can be configured with display screen 1902. Also, mobile device 1900 can include input button 1904. Furthermore, in some cases, mobile device 1900 can be configured with a touch-sensitive screen. In other cases, mobile device 1900 can include any other input devices. It will be understood that mobile device 1900 can include various other provisions including speakers, a microphone, ports for syncing and/or powering mobile device 1900, a headphone jack as well as various other provisions which are not visible in FIG. 19.

Mobile device 1900 can be configured to run one or more software applications. In some cases, software applications can be provided on mobile device 1900 at the time of manufacturing. In other cases, software applications can be downloaded from a service provider. In one exemplary embodiment, a user may purchase an application from an online retail store such as iTunes.

In the current embodiment, mobile device 1900 may include antenna 1930 that may be utilized for transmitting and receiving information. In some cases, antenna 1930 may be capable of receiving information from electronic identification device 1934 of shirt 1940. In some cases, electronic identification device 1934 could be a radio-frequency identification (RFID) tag.

Mobile device 1900 may also be connected to article of footwear 1920. In some cases, mobile device 1900 may be connected to article 1920 using wired connection 1918. In particular, mobile device 1900 includes port 1914 for receiving information from article 1920 via wired connection 1918. In other cases, however, mobile device 1900 may be in communication with article 1920 in any other manner, including wireless connections.

In the current embodiment, mobile device 1900 may use the signal received from electronic identification device 1934 to identify shirt 1940. In particular, the identifying information may include the type of article as well as the color of the article. In this case, mobile device 1900 determines that shirt 1934 is associated with first color 1958. Following this, mobile device 1900 may determine a coloring scheme for article 1920 that coordinates with first color 1958. In this case, mobile device 1900 selects second color 1960 for article 1920 that will color coordinate with shirt 1940. In particular, mobile device 1900 controls color change portion 1922 to change to second color 1960. In embodiments where color change portion 1922 comprises an electrochromographic material, a control unit associated with color change portion 1922 may apply an electrical signal to color change portion 1922 to change color change portion 1922 to second color 1960. This arrangement may increase the mobility of color change system 1901.

In some embodiments, mobile device 1900 can include additional provisions for sensing information about an article. In some cases, for example, mobile device 1900 could include an optical device for sensing optical information about an article. Examples of different optical devices that may be incorporated into a mobile device include, but are not limited to: a digital camera, a video camera, a scanner, as well as any other imaging device.

Figure 20:
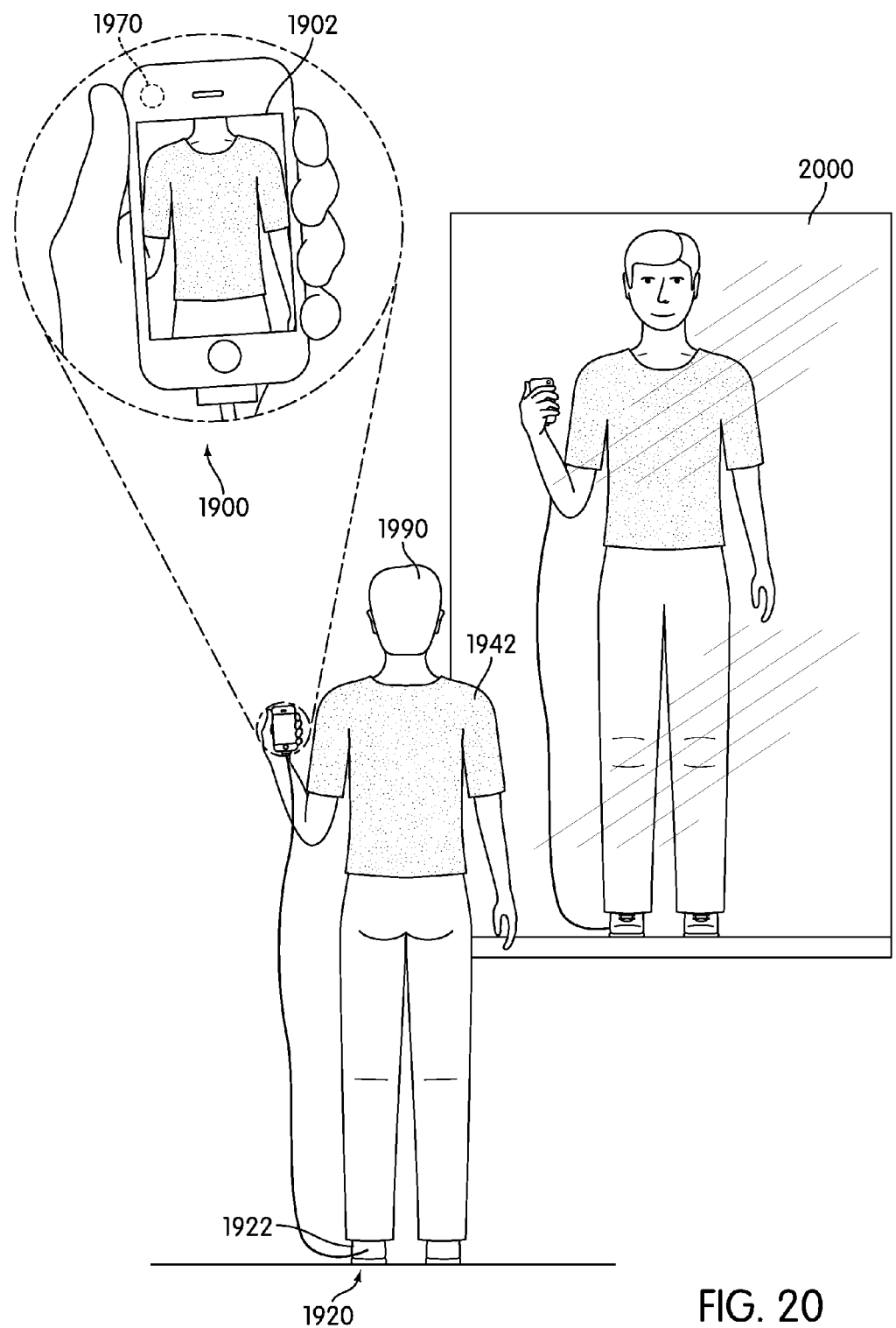
FIG. 20 is a schematic view of an embodiment of a method of detecting an article of clothing for use with a color change system using a mobile device.

Referring to FIG. 20, mobile device 1900 may be configured with camera 1970. In different embodiments, the location of camera 1970 can vary. In the current embodiment, camera 1970 may be disposed on a side of mobile device 1900 that is opposite of display screen 1902. In this case, user 1990 may take a picture of shirt 1942 in mirror 2000 using mobile device 1900. Mobile device 1900 may then analyze the picture of shirt 1942 to a coordinating color for color change portion 1922.

A color change system can include provisions for operating in various power modes. In some embodiments, a color change system may be configured to operate in a high power mode when an article is connected directly to an external power source. In addition, a color change system may be configured to operate in a low power mode when an article is connected to an internal power source only. In addition, a high power mode may be a mode in which a color change system applies color changes quickly in a color change portion due to an abundance of power. In contrast, a low power mode may be a mode in which a color change system applies color changes slowly or simply maintains colors for a color change portion due to a limited supply of power. This arrangement may be useful for conserving power in embodiments where color changing technologies are used that have relatively high power requirements.

Figure 21:
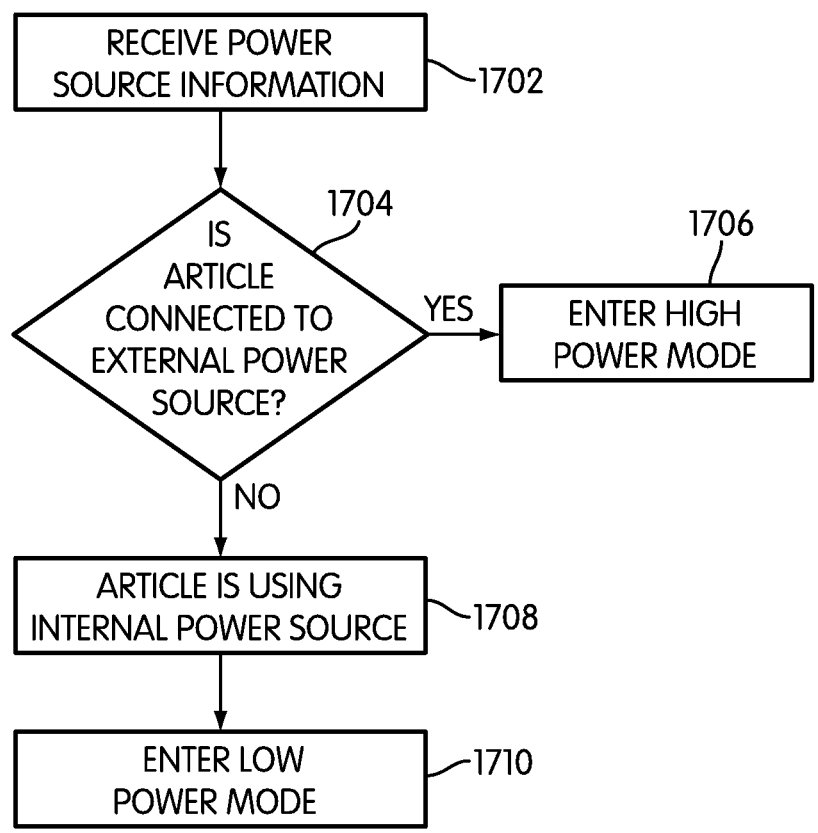
FIG. 21 is an embodiment of a process for controlling a color change system.

FIG. 21 illustrates an embodiment of a process for operating a color change system in various power modes. In this embodiment, the following steps may be performed by control unit 124; however in some embodiments these steps may be performed by additional systems or devices associated with article 100. For example, in some cases including sensors or devices for measuring various performance parameters, one or more steps could be performed by the sensors or devices. In addition, in embodiments where article 124 is in communication with a computer, one or more of the steps could be performed by the computer. In addition, it will be understood that in other embodiments one or more of the following steps may be optional.

During first step 1702, control unit 124 may receive power source information. Generally, any method known in the art for detecting power source information can be used. Next, during step 1704, control unit 124 may determine if the article is connected to an external power source. If so, control unit 124 may proceed to step 1706 and enter a high power mode. During the high power mode, control unit 124 may change the colors of one or more color change portions rapidly, due to the greater availability of power for operating the color change portions.

If, during step 1704, control unit 124 determines that the article is not connected to an external power source, control unit 124 may proceed to step 1708. During step 1708, control unit 124 may determine that the article is using an internal power source. Examples of internal power sources are discussed above and include any types of batteries and/or piezoelectric devices, as well as other types of portable power sources. Following step 1708, control unit 124 may proceed to step 1710 and enter a low power mode. During the low power mode, control unit 124 may change the colors of one or more color change portions slowly in order to preserve power. In some cases, color changes may not occur during low power mode and instead low power mode may be reserved for actively or passively maintaining a particular color for a color change portion.

Figure 22:
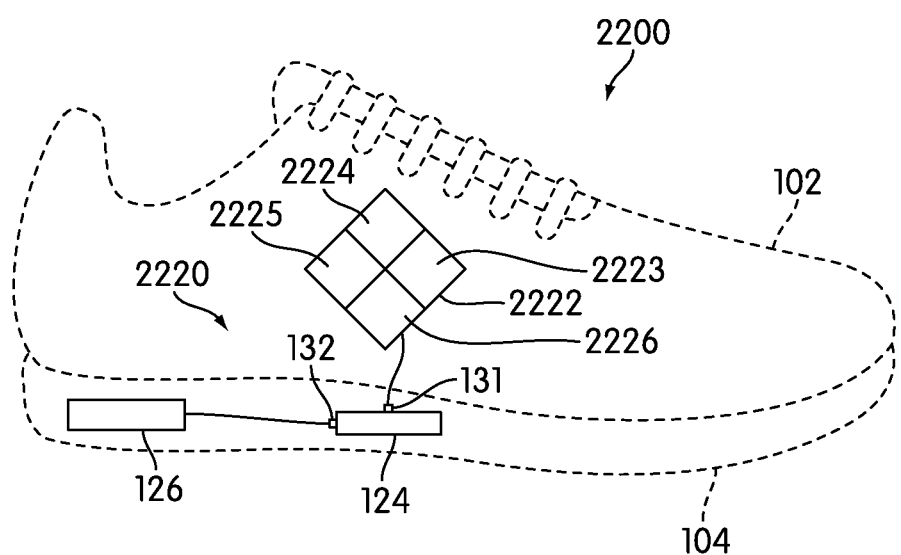
FIG. 22 is an alternate exemplary embodiment of an article of footwear with a color change portion.

Referring now to FIG. 22, an alternate exemplary embodiment of an article of footwear 2200 is illustrated. Article 2200 may include one or more components that are substantially similar to components associated with article 100, described above, including, but not limited to upper 102 and/or sole 104. In some embodiments, article 2200 may include a color change system 2220. Color change system 2220 may include one or more components that are substantially similar to components associated with color change system 120, discussed above, including, but not limited to: control unit 124, power storage device 126, port 131, and/or port 132. In an exemplary embodiment, color change system 2220 may include a color change portion 2222. Color change portion 2222 may be substantially similar to color change portion 122, discussed above.

In some embodiments, color change system 2220 may include color change portion 2222 associated with multiple individual color change portions. In an exemplary embodiment, color change portion 2222 may include a first color change portion 2223, a second color change portion 2224, a third color change portion 2225, and/or a fourth color change portion 2226. Each of first color change portion 2223, second color change portion 2224, third color change portion 2225, and/or fourth color change portion 2226 may be comprised of an individual color change portion substantially similar to color change portion 122, discussed above. In some embodiments, control unit 124 may control each of first color change portion 2223, second color change portion 2224, third color change portion 2225, and/or fourth color change portion 2226 separately. In other embodiments, control unit 124 may control color change portion 2222 as a single component.

In an exemplary embodiment, color change portion 2222, including any of first color change portion 2223, second color change portion 2224, third color change portion 2225, and/or fourth color change portion 2226 may be associated with an electronic paper technology. In one embodiment, first color change portion 2223, second color change portion 2224, third color change portion 2225, and/or fourth color change portion 2226 may comprise individual tiles that together form color change portion 2222. With this arrangement, individual tiles of electronic paper may be arranged to form a larger color change portion on an article. In some cases, a substantially rigid electronic paper may be associated with any of first color change portion 2223, second color change portion 2224, third color change portion 2225, and/or fourth color change portion 2226. In embodiments where substantially rigid electronic paper is used, a tiled arrangement may provide flexibility to color change portion 2222. In other cases, a substantially flexible electronic paper and/or any other color change technology discussed herein may be associated with any of first color change portion 2223, second color change portion 2224, third color change portion 2225, and/or fourth color change portion 2226.

Figure 23:
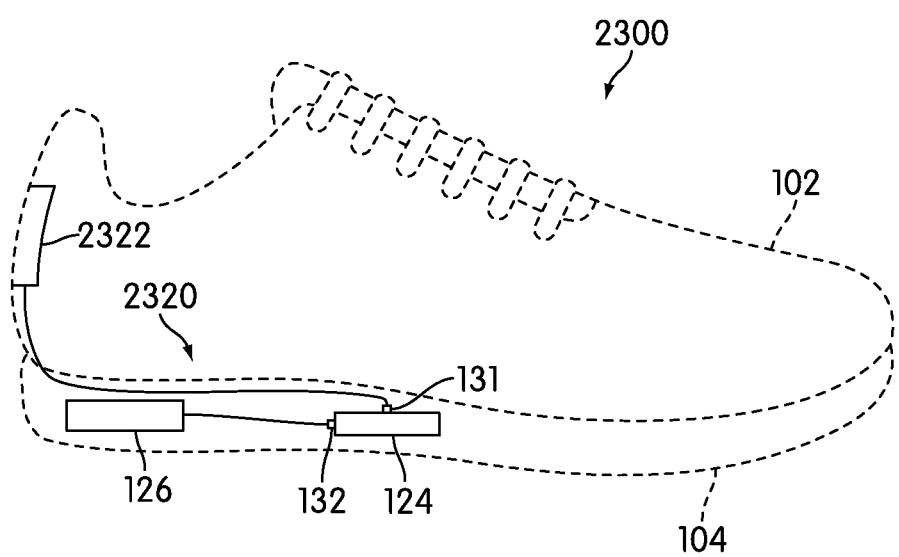
FIG. 23 is an alternate exemplary embodiment of an article of footwear with a color change portion.
Figure 24:
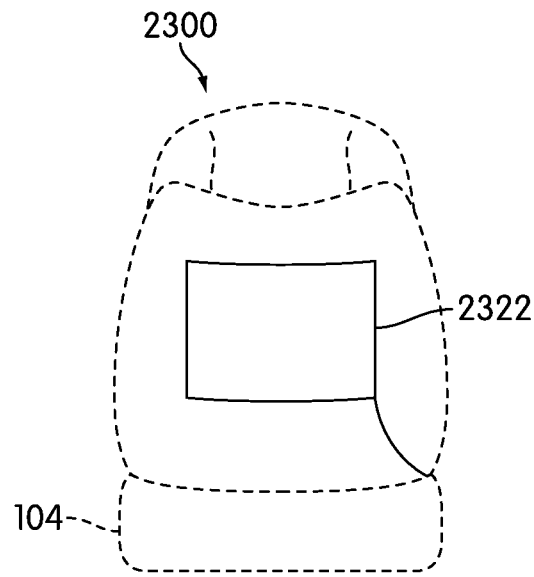
FIG. 24 is a rear view of an alternate exemplary embodiment of an article of footwear with a color change portion.

In other embodiments, a color change system may be associated with a curved portion of an article of footwear. Referring now to FIGS. 23 and 24, an alternate exemplary embodiment of an article of footwear 2300 is illustrated. Article 2300 may include one or more components that are substantially similar to components associated with article 100, described above, including, but not limited to upper 102 and/or sole 104. In some embodiments, a color change system 2320 may be associated with a curved portion of article 2300. For example, in one embodiment, color change system 2320 may be associated with a portion of article 2300 associated with a heel of a user. Color change system 2320 may include one or more components that are substantially similar to components associated with color change system 120, discussed above, including, but not limited to: control unit 124, power storage device 126, port 131, and/or port 132. In an exemplary embodiment, color change system 2320 may include a curved color change portion 2322. Curved color change portion 2322 may be substantially similar to color change portion 122, discussed above.

In one embodiment, curved color change portion 2322 may be associated with one or more curved portions of article 2300. In an exemplary embodiment, curved color change portion 2322 may be associated with a portion of the heel of article 2300. As shown in FIG. 24, curved color change portion 2322 may wrap around a portion of the heel of article 2300. In some cases, a substantially flexible electronic paper technology or electrochromic fibers or fabrics that retain color change after removal of applied power may be associated with curved color change portion 2322. In embodiments where a substantially flexible electronic paper technology or electrochromic fibers or fabrics are used, curved color change portion 2322 may be configured to substantially conform to the curved shape of the heel of article 2300. In other cases, any other flexible color change technology discussed herein may be associated with curved color change portion 2322.

Figure 25:
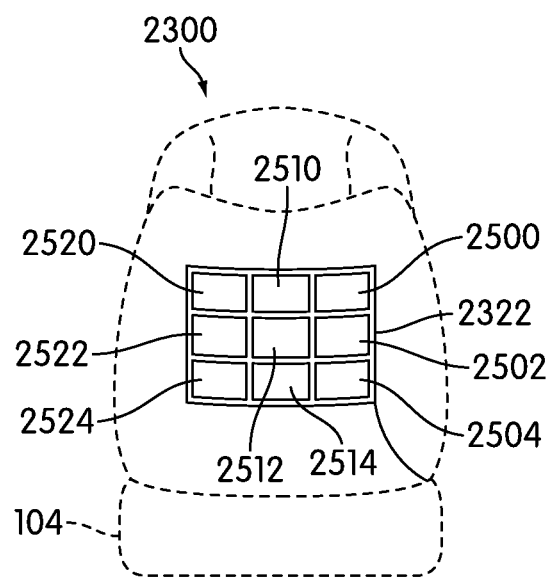
FIG. 25 is a rear view of an alternate exemplary embodiment of an article of footwear with a color change portion.

In some embodiments, curved color change portion 2322 may be associated with multiple individual color change portions. As shown in FIG. 25, an alternate exemplary embodiment of curved color change portion 2322 may be associated with a plurality of individual color change portions arranged in a tiled configuration. In one embodiment, curved color change portion 2322 may include a first color change portion 2500, a second color change portion 2502, a third color change portion 2504, a fourth color change portion 2510, a fifth color change portion 2512, a sixth color change portion 2514, a seventh color change portion 2520, an eighth color change portion 2522, and/or a ninth color change portion 2524. Each individual color change portion forming curved color change portion 2322 may be substantially similar to any of first color change portion 2223, second color change portion 2224, third color change portion 2225, and/or fourth color change portion 2226, described above. In addition, control unit 124 may control each of the plurality of individual color change portions separately, or curved color control portion 2322 as a single component, as described in reference to FIG. 22.

In some embodiments, one or more of individual color change portions of curved color change portion 2322 may be arranged in groups. In one embodiment, groups may be associated with a row or column in a tiled arrangement of individual color change portions. In some cases, various groups may be associated with different color change technologies.

For example, in one embodiment, a first group of individual color change portions including first color change portion 2500, second color change portion 2502, and third color change portion 2504 may be associated with a curved portion of the heel of article 2300 on one side. Similarly, a second group of individual color change portions including seventh color change portion 2520, eighth color change portion 2522, and ninth color change portion 2524 may be associated with a curved portion of the heel of article 2300 on the opposing side. A third group of individual color change portions including fourth color change portion 2510, fifth color change portion 2512, and sixth color change portion 2514 may be associated with a center portion of the heel between the first group and the second group. In this embodiment, the first group may be associated with an electrochromic fiber or fabric and the second group may be associated with a substantially flexible electronic paper, while the third group may be associated with a substantially rigid electronic paper. With this arrangement, curved color change portion 2322 may be configured to substantially conform to the curved shape of the heel of article 2300.

In other embodiments, curved color change portion 2322 may be associated with a plurality of individual color change portions of a substantially similar color change technology, including, but not limited to any one or more of a substantially rigid electronic paper, a substantially flexible electronic paper, electrochromic fiber or fabric, and/or any other color change technology discussed herein. In various embodiments, any one or combination of a substantially rigid electronic paper, a substantially flexible electronic paper, electrochromic fiber or fabric, and/or any other color change technology discussed herein may be associated with any of first color change portion 2500, second color change portion 2502, third color change portion 2504, fourth color change portion 2510, fifth color change portion 2512, sixth color change portion 2514, seventh color change portion 2520, eighth color change portion 2522, and/or ninth color change portion 2524.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of operating an article of footwear with a color change portion, comprising:
   measuring a performance parameter;
   coloring the color change portion with a first color when the performance parameter is in a first range of values;
   coloring the color change portion with a second color when the performance parameter is in a second range of values, the second range of values being substantially different from the first range of values and the second color being substantially different from the first color; and wherein the color change portion comprises an electrochromographic material comprising electrochromic fiber or fabric.

2. The method according to claim 1, wherein the electrochromic fiber or fabric comprise one or more selected from the group consisting of electrically conductive materials, nonconductive materials and combination thereof.

3. The method according to claim 2, wherein the electrically conductive materials are selected from the group consisting of electrically conductive metals, electrically conductive organic material and combinations thereof.

4. The method according to claim 3, wherein the electrically conductive metals are selected from the group consisting of silver, copper, gold, iron, aluminum, zinc, nickel, tin and combinations thereof.

5. The method according to claim 3, wherein the electrically conductive organic materials are conjugated polymers selected from the group consisting of poly(thiophene), poly(pyrrole), poly(aniline), poly(acetylene), poly(p-phenylenevinylene), poly(3,4-ethylenedioxythiophene) poly(styrenesulfonate) and combinations thereof.

6. The method according to claim 2, wherein the nonconductive materials are selected from the group consisting of natural materials and synthetic organic polymers.

7. The method according to claim 6, wherein the natural materials are selected from the group consisting of cotton, silk, wool and combinations thereof.

8. The method according to claim 6, wherein the synthetic organic polymers are selected from the group consisting of nylon, polyester, polyethylene, polyacrylic, polyurethane, polylactide and combinations thereof.

9. The method according to claim 2, wherein the nonconductive fiber or fabric is coated or impregnated with an electrically conductive material and subsequently coated with an electrochromic material.

10. The method according to claim 9, wherein the electrochromic material is selected from the group consisting of transition metal oxides, fullerenes, ferric ferricyanide, ferrocenes, ferrocenyl salts, phthalocyanines, viologens, dyes, iodine-doped poly(acetylene), poly(thiophene), poly(phenylene), poly(phenylene sulfide), poly(pyrrole), poly(aniline), silane precursors, norbornene precursors, soluble conducting polymers, and combination thereof.

11. A method of operating an article of footwear with a color change portion, comprising:
receiving a user selected color;
applying an electrical signal to an electrochromographic material associated with the color change portion; and
thereby changing the color change portion from an initial color to the user selected color, the initial color being different from the user selected color; and
wherein the electrochromographic material comprises electrochromic fiber or fabric.

12. The method according to claim 11, wherein the electrochromic fabric comprises conductive material or nonconductive material.

13. The method according to claim 12, wherein the nonconductive fabric is coated with conductive material.

14. The method according to claim 13, wherein the fabric comprising conductive material and the fabric comprising nonconductive material coated with conductive material are further coated with electrochromic material.

15. The method according to claim 14, wherein the fabric comprising electrochromic material is further coated with gel electrolyte.

16. The method according to claim 15, wherein the electrochromic material and gel electrolyte are applied to the fiber or fabric with one or more technique selected from the group consisting of spray coating, ink jet coating, stamping, screen printing, rotary press, dip coating, electrostatic spinning, gravure coating methods, and extrusion coating.

17. A method of operating an article of footwear with a color change portion, comprising:
receiving information related to a first color of an object, the object being associated with a user of the article of footwear;
determining a second color for the color change portion according to the first color;
applying an electrical signal to an electrochromographic material associated with the color change portion; and
thereby changing the color change portion to the second color; and
wherein the electrochromographic material comprises electrochromic fiber or fabric.

18. The method according to claim 17, wherein the electrochromic fabric comprises two or more independently electrically addressable electrochromic fibers.

19. The method according to claim 18, wherein the electrochromic fabric displays a multi-colored visual image upon application of the electrical signal.

20. The method according to claim 19, wherein the multi-colored visual image is a still image or an animated image.

21. The method according to claim 17, wherein the electrochromic fabric comprises two or more electrochromic fibers which are not independently electrically addressable.

22. The method according to claim 17, wherein the electrochromic fabric is a two-dimensional woven or non-woven planar sheet.

23. The method according to claim 17, wherein the electrochromic fabric is shaped into a three-dimensional conformation.

24. The method according to claim 17, wherein the color change portion comprises an entire upper of the article of footwear.

* * * * *